United States Patent
Cooper

(10) Patent No.: US 10,471,766 B2
(45) Date of Patent: Nov. 12, 2019

(54) CLIPBOARD AND PORTABLE COMPUTING DEVICE SYSTEM

(71) Applicant: David T. Cooper, Clinton Township, MI (US)

(72) Inventor: David T. Cooper, Clinton Township, MI (US)

(*) Notice: Subject to any disclaimer, the term of this patent is extended or adjusted under 35 U.S.C. 154(b) by 40 days.

(21) Appl. No.: 15/822,178

(22) Filed: Nov. 26, 2017

(65) Prior Publication Data
US 2018/0072090 A1    Mar. 15, 2018

Related U.S. Application Data

(63) Continuation of application No. 14/566,216, filed on Dec. 10, 2014, now Pat. No. 9,827,807.

(60) Provisional application No. 61/914,466, filed on Dec. 11, 2013.

(51) Int. Cl.
  *A47B 97/04* (2006.01)
  *B42F 9/00* (2006.01)
  *G06F 1/16* (2006.01)

(52) U.S. Cl.
  CPC ............ *B42F 9/002* (2013.01); *G06F 1/1628* (2013.01); *G06F 1/1632* (2013.01)

(58) Field of Classification Search
  CPC ... E06B 9/323; E06B 9/50; E06B 9/42; E06B 9/262; E06B 9/03; A47B 23/042; A47B 23/043; A47B 23/06; A47B 97/08
  USPC ..... 248/451, 452, 453, 460, 461, 441.1, 444
  See application file for complete search history.

(56) References Cited

U.S. PATENT DOCUMENTS

| | | | |
|---|---|---|---|
| 4,927,986 A * | 5/1990 | Daly | G06F 1/1626 178/19.01 |
| 5,586,002 A | 12/1996 | Notarianni | |
| 6,637,774 B2 | 10/2003 | Gaska | |
| 7,536,960 B1 * | 5/2009 | Perez | A47B 23/002 108/27 |
| 7,717,393 B2 * | 5/2010 | Edgmon | A47B 97/08 206/1.7 |

(Continued)

OTHER PUBLICATIONS

"Clipboard+, The only iPad Clipboard", Copyright 2013; retrieved Dec. 9, 2014, 5 pages, available at: http://clipboard-plus.com/product.

(Continued)

*Primary Examiner* — Steven M Marsh
(74) *Attorney, Agent, or Firm* — E.D. Jorgenson Law, LLC; Eric D. Jorgenson

(57) ABSTRACT

A clipboard system comprising a clipboard that cooperates with a case of a portable computing device (e.g., a tablet computer) such that the case attaches to the clipboard to enable interchangeable usage of the portable computing device and the clipboard. The case enables the portable computing device to be enclosed and supported, and utilized while coupled with the clipboard. The case receives the computing device and secures the device therein, while exposing the device display and the device controls for user interaction. The case comprises a backside having affixed thereto an attachment material such as one part of a two-part fastener that securely interfaces to the other part of the fastener material affixed to the clipboard. The attachment material is of sufficient strength to hold the case and enclosed computing device to the clipboard during normal usage.

19 Claims, 21 Drawing Sheets

(56) References Cited

U.S. PATENT DOCUMENTS

| | | | |
|---|---|---|---|
| 8,312,991 B2 | 11/2012 | Diebel et al. | |
| 8,328,008 B2 | 12/2012 | Diebel et al. | |
| 8,480,144 B2 | 7/2013 | Potter et al. | |
| 2001/0048059 A1* | 12/2001 | Jones, II | A47B 97/08 248/461 |
| 2005/0098703 A1 | 5/2005 | Cziraky | |
| 2007/0070590 A1 | 3/2007 | Littlepage | |
| 2008/0002394 A1 | 1/2008 | Jones | |
| 2011/0057088 A1 | 3/2011 | Hsu | |
| 2011/0126739 A1* | 6/2011 | Korpi | A47B 23/044 108/6 |
| 2012/0037285 A1 | 2/2012 | Diebel et al. | |
| 2012/0319414 A1 | 12/2012 | Potter et al. | |
| 2013/0206527 A1 | 8/2013 | Von Furstenberg | |
| 2015/0052706 A1* | 2/2015 | Kalis | E05D 5/04 16/224 |

OTHER PUBLICATIONS

"Hard CaseTM for iPad", retrieved Dec. 9, 2014, 1 page, available at: http://www.hardcaseforipad.com.

"TIET Introduces 737 MyClipboard for the Popular Tablet Devices", dated Nov. 2, 2011, 3 pages, available at: http://www.aero-news.net/index.cfm?do=main.textpost&id=9c6dc12a-5c2f-46a4-9fd1-eb5641dc3d76.

"iPad Zipper Pad Holder with Smart Magnetic Flap" by Samsill, retrieved Oct. 17, 2013, 9 pages, available at: http://www.samsill.com/business-accessories/pad-holders/ipad-zipper-pad-holder-with-smart-magnetic-flap.

* cited by examiner

CLIPBOARD AND PORTABLE COMPUTING DEVICE SYSTEM

CROSS-REFERENCE TO RELATED APPLICATIONS

This application is a Continuation of pending patent application Ser. No. 14/566,216, filed Dec. 10, 2014, and entitled "CLIPBOARD AND PORTABLE COMPUTING DEVICE SYSTEM", the entirety of which is incorporated by reference herein, and which claims the benefit of U.S. Provisional Patent application Ser. No. 61/914,466 entitled "CLIPBOARD AND PORTABLE COMPUTING DEVICE SYSTEM" and filed Dec. 11, 2013, the entirety of which is incorporated by reference herein. This application is related to patent application Ser. No. 14/211,231, entitled "CLIPBOARD SYSTEM" and filed Mar. 14, 2014, which claims the benefit of Provisional Patent Application Ser. No. 61/789,447 entitled "CLIPBOARD SYSTEM", and filed Mar. 15, 2013.

BACKGROUND

Portable computing devices, such has tablets, are abundant in day-to-day use for personal purposes. Such portable computing devices include the hardware and software computing resources for business purposes as well, such as interfacing to business databases and other business-related data. Another apparatus used extensively is the clipboard, on which documents are clipped to facilitate user review and writing for the intended purposes. Both items serve useful and sometimes overlapping purposes.

However, existing implementations of the portable computing device and clipboard are handled as separate items such that should the user choose to use both the portable computing device and the clipboard in hand, the user is then burdened with an either-or situation where if the device is used, the clipboard is placed off to the side, and if the clipboard is to be used, the device is placed off to the side. There is no existing implementation where both the device and the clipboard can be conveniently used as a single in-hand system.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed clipboard and portable computing device system, generally, is a case and attachment mechanism for a portable (or hand-held) computing device (e.g., a tablet PC) that enables use of the portable computing device with a clipboard (e.g., single board, double-sided, folding, etc.). The case enables the portable computing device to be supported and used while in cooperation with the clipboard.

The case receives the portable computing device and secures the portable computing device therein, while exposing the device display (e.g., touch-based) for user interaction. The case comprises a backside having affixed thereto an attachment material such as one part of a two-part fastener (e.g., a two part hook-and-loop fabric fastener such as Velcro™ or other suitable mechanical fasteners) that securely interfaces to the other part of the fastener affixed to the clipboard or an auxiliary board. The attachment material can be affixed to either or both sides of the clipboard to receive the case; however, the backside may be desired so that the front side of the clipboard can be used for clamping documents, papers, etc.

The case also operates to protect/mitigate damage to the portable computing device from shock that may be experienced due to dropping or normal usage contacts with other surfaces or objects. The case also comprises a flap (also referred to as a folding portion) that when opened allows insertion/removal of the portable computing device. The flap can be securely attached in the closed position using the same fastener material as mentioned above.

In another embodiment, the case and attachment system comprises the auxiliary board that cooperates with (e.g., attachable to and removable from) the clipboard. In this implementation, the auxiliary board comprises one part of the attachment material that mates with the other part on the case to receive the cased portable computing device. The auxiliary board then securely interfaces to the clipboard, such as the backside of the clipboard, so the user can access (interact with) both the device and the documents by turning the clipboard to access the portable computing device and then flip back to access the documents.

Other embodiments of the case comprise a strap (or tether) of sufficient length so as to enable attachment to the clipboard/auxiliary clipboard to prop-up the portable computing device on a flat surface for slanted (tilted) viewing and use that replicates the display angle of a laptop computer, for example, when in normal use on a desk top.

The case may optionally comprise a cover hinged on one side of the case so that the cover can be moved (opened) to gain ready access to the device display and other portable computing device controls/sensors. The inside of the cover can further include additional soft material that when closed mitigates/protects the portable computing device and device display from damage. The cover can also utilize the similar attachment material (e.g., Velcro) to enable quick opening and closing, as well as secure support and protection of the portable computing device when closed; however, this is not a requirement, since other attachment mechanisms may be employed, such as buttons, snaps, clamps, etc. The case includes one or more cutouts that enable user interaction with device controls that may exist on the device housing, and also enables device sensors such as a camera, microphone, speakers, etc., unimpeded access to output, receive, and sense signals. The case is designed to also receive a removable tether so that the clipboard/auxiliary clipboard/device can be suspended or carried as a unit by the tether. The case can include multiple cutouts that enable the tether to be captured and used on more than one side of the case.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
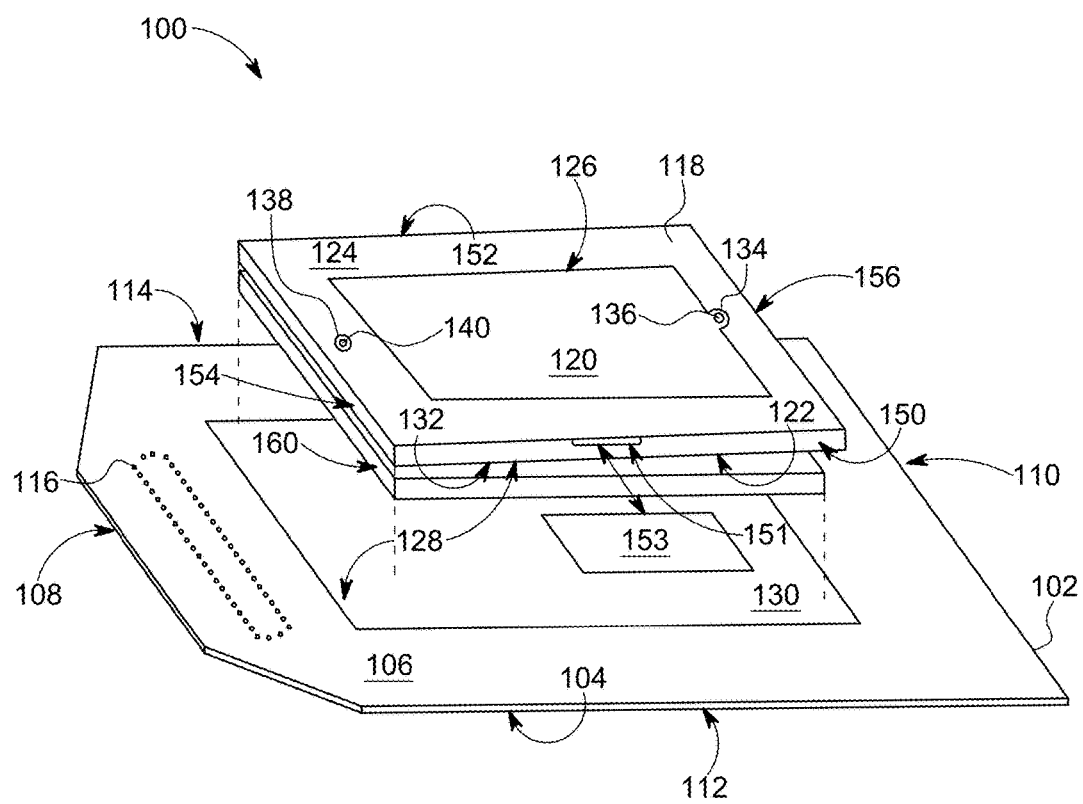
FIG. 1 illustrates a clipboard and portable computing device system.

The disclosed clipboard and portable computing device system comprises a clipboard (e.g., single-sided, double-sided, folding, etc.) that cooperates with a case for a portable computing device (e.g., a tablet computing device, handheld computing devices, etc.) such that the case suitable for a given portable computing device attaches to the clipboard or other boards used to mount the portable computing device to the clipboard thereby enabling interchangeable usage of the portable computing device and the clipboard. The case enables the portable computing device to be enclosed and supported, and utilized while in cooperation with the clipboard. The case receives the portable computing device and secures the device therein, while exposing the device display (e.g., touch-based) for user interaction.

The case comprises a backside having affixed thereto an attachment material such as one part (e.g., loops) of a two-part fastener (e.g., a two part hook-and-loop fabric fastener such as Velcro™) that securely interfaces to the other part (e.g., the hooks) of the fastener material affixed to the clipboard. The attachment material can be affixed to either or both sides of the clipboard to receive the case; however, the backside may be desired so that the front side of the clipboard, when using a single-sided clipboard, can be used for clipping papers, etc., to secure the papers in position on the clipboard. The attachment material is of sufficient strength to hold the case and enclosed computing device to the clipboard during normal usage.

The case also operates to protect/mitigate damage to the device from shock that may be experienced due to dropping or normal usage contacts with other surfaces or objects. The case also comprises a flap (also referred to as a folding portion) that when opened enables insertion/removal of the device from the case. The flap can be securely attached in the closed position using the same two-part fastener material as mentioned above.

The case can also provide a sufficiently-sized keyboard cutout along the side (or periphery of the case) in accordance with a variety of different and differently-sized portable computing devices that can be utilized and enclosed in the case, to enable the utilization of a wireless keyboard rather than or in combination with, the virtual keyboard normally presented on the device display when a physical keyboard is not used or detected by the computing device. For example, some tablet computers automatically enable the virtual keyboard in the device display when the physical keyboard is detached or communications between the computing device and the physical keyboard is insufficient or nonexistent to enable use of the physical keyboard.

A specific keyboard cutout in the side of the case can be provided to enable physical attachment or coupling (e.g., magnetic coupling) of a detachable keyboard to the computing device. In one implementation, the detachable keyboard, when attached, makes a physical connection to the computing device, once magnetically coupled to the computing device. In another implementation, the keyboard can be a wireless keyboard (e.g., Bluetooth™, or other wireless short-range communications technology) that does not require a direct contact connection with the computing device, yet can be used as desired to interface to the computing device.

In support of physical keyboard use, the case (and enclosed device) can be detached, rotated to the desired orientation, and then reattached (to prop the device at the desired angle), to the clipboard assembly, in order to use the physical keyboard.

In another embodiment, the case and attachment system comprises an auxiliary board that cooperates with removable attachment from/to the clipboard. A first auxiliary side of the auxiliary board comprises a first part of the two-part attachment material, and the backside of the case has attached thereto an attachment portion that comprises the second part of the two-part attachment material; thus, the backside of the case affixes to the first auxiliary side of the auxiliary board via the attachment material. The attachment material is of sufficient strength to hold the case and enclosed portable computing device to the auxiliary board. The auxiliary board then securely interfaces to the clipboard, such as the backside, so the user can simply access both the device and the documents by turning the clipboard to access the computing device, and then flip back to the clipboard to access the papers.

The case comprises a strap of sufficient length so as to enable attachment to the clipboard/auxiliary clipboard to prop-up the portable computing device on a flat surface for slanted viewing and use of the device display, a position that replicates the display angle of a laptop computer when in normal use on a desk.

Optionally, the case can also comprise a display cover hinged on one side of the case so that the cover can be moved (opened) to gain ready access to the device display and other device controls. The inside of the display cover includes additional soft material that when closed contacts the display to mitigate/protect the device display from damage. The display cover also utilizes the similar attachment material (e.g., Velcro) to enable quick opening and closing, as well as secure support and protection of the portable computing device when the cover is closed.

The case includes one or more cutouts that expose device controls and buttons that may exist on the portable computing device and device display frame, and enable user interaction with portable computing device, device display, and controls/buttons. The case also includes cutouts for device sensors such as a camera, microphone, audio speakers, etc., to enable unimpeded access to the outside environment to receive/send and sense signals. The case is designed to also receive a removable tether so that the clipboard/auxiliary board/device can be suspended as a unit by the tether. Other features are provided as well.

With respect to implementation with the double-sided clipboard, the double-sided clipboard may be a system wherein each side of the system includes a clipboard. For instance, embodiments may include a main board, which may be generally rectangular in shape and may define a first major face and a second major face. The main board may also include a top edge, a bottom edge, a first side edge and a second side edge. Main boards may be made from a variety of convenient materials known in the art including wood, polycarbonate, PVC (polyvinyl chloride), polypropylene, high-impact polystyrene, polyolefin, or other common polymer materials.

Embodiments also include a pair of clipping apparatuses. A clipping apparatus may be a spring-loaded clamp for retaining items such as papers or pads of paper against a major face of the clipboard system. Items retainable in this manner may be referred to herein as clipboard items. An embodiment may have the clipping apparatus disposed near the top edge of either or both major faces. Furthermore, the clipping apparatuses may cooperate to sandwich the "main board" (the double-sided clipboard) therebetween in a fastened relation.

Some embodiments may include a secondary retention system for retaining clipboard items. For example, a secondary retention system can comprise an elastic band (also referred to as an elastic strap) which cooperates with c-shaped notches disposed on opposing sides of a main board. Thus, the elastic band may be retained by the notches. Furthermore, the secondary retention system may be disposed in the lower half of the main board, or even nearer to the bottom edge. Thus, a clipboard item such as a legal pad may be primarily retained by the clipping apparatus near the top edge of the main board, but may be secondarily retained and secured using the secondary retention system near the lower edge of the main board. Such an arrangement may be especially suitable for outdoor applications that may be exposed to wind, or any time a user wishes hold a lower edge of an item.

According to some embodiments, a c-shaped notch may comprise an aperture which is located so close to an edge that it breaks through a portion of the edge, thereby forming the c-shaped notch. Alternatively, the c-shaped notch may comprise a through-hole near an edge of a main board, where an additional cut-out is made from the side edge to the through-hole thus forming a c-shaped notch.

Embodiments may further include a plurality of shoulder-strap apertures (also referred to as corner notches) which are adapted to engage a shoulder strap. For example, a shoulder-strap aperture may be located near a side edge of the system so that a clasp located at an end of a shoulder strap may engage the main board through the shoulder-strap aperture. To further illustrate, if a shoulder-strap aperture is located too far from a side edge of the system then a clasp (also referred to as a clip) would need to be excessively and/or inconveniently large in order to engage it. Thus, as used herein, shoulder-strap apertures which are said to be located near a side edge of the system are close enough to the side to allow a clasp having a convenient and suitable size to be used. Embodiments may have a single shoulder-strap aperture adapted to engage both clasps of a shoulder strap (i.e., the clasps at either end thereof). Alternatively, embodiments may have two or more shoulder-strap apertures so that each end of a shoulder strap may engage a different shoulder-strap aperture.

According to one embodiment, a system includes a pair of shoulder-strap apertures near the first side edge of the main board, and a second pair of shoulder-strap apertures near the second edge thereof. Furthermore, the pairs of shoulder-strap apertures on the respective sides may be spaced apart so that one is near the top edge of the main board and the other is near the bottom edge of the main board. Placement of the shoulder-strap apertures in this way enables a user to select one of four preferred orientations for carrying the system. Particularly, if either end of a shoulder strap is affixed to the shoulder-strap apertures near the top edge, then the system can be carried in an upright orientation. Conversely if the shoulder-strap apertures near the bottom edge are engaged then the system will be carried in an inverted orientation. Alternatively, one end of a shoulder strap may engage an aperture near the top edge of a side and the other may engage the aperture near the bottom edge of the same side. Thus, the system can be carried in a sideways orientation.

A shoulder strap according to embodiments may comprise a generally elongate strip of fabric having clasps at either end. Furthermore, suitable shoulder straps may be adjustable in length to allow for users of different sizes or body types. The shoulder strap may have a clasp at either end, and the clasp may comprise a circular hook which may be closable or partially closable so as to resist disengaging a shoulder-strap aperture. Furthermore, a clasp may further include a through-hole which may be adapted to engage an elastic band. For instance, both ends of an elastic band may engage the through-holes clasps located at either end of a shoulder strap. According to some embodiments, joining the clasps of a shoulder strap in this way may assist a user of the embodiment in keeping the strap around his neck or shoulder even if the clipboard is disengaged from the shoulder strap clasps.

Embodiments may also include an accessory (or utility) bag suitable for containing and carrying the shoulder strap, pens, or other supplies which may be needed in the course of using the clipboard system. Accessory bags according to some embodiments may include a cinch which functions as a bag closure. Furthermore, the accessory bag may also include a fastening apparatus such as a bag clasp which may be adapted to engage an accessory aperture disposed near a bottom edge of the main board.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a portable computing device and clipboard system 100 in accordance with the disclosed architecture. The system 100 can include a clipboard 102 (e.g., single sided, double sided, folding, etc.) having a first face 104 (shown as facing downward) and a second face 106 (shown as facing upward), a top edge 108, a bottom edge 110, a first side edge 112, a second side edge 114, and a clipping apparatus 116 affixed near the top edge 108 of the first face 104 (the dotted lines indicate the clipping apparatus 116 (out of view) as mounted on the first face 104 near the top edge 108 for a single-sided clipboard).

A case 118 for a portable computing device, such as a tablet computer, receives and encloses the computing device (showing only the device display 120). The case 118 comprises a back surface 122 facing downward to the second face 106 of the clipboard 102, a front surface 124 that opposes the back surface 122 and exposes a viewing portion 126 as a cutout in the front surface 124 that is sufficiently large and shaped to expose the device display 120 and via which the device display 120 of the device is viewed.

The case 118 can also be defined dimensionally as having a first long side 150, a second long side 152, a first short side 154, and a second short side 156. Thus, the length is of a dimension defined as the straight-line perpendicular distance between the first short side 154 and the second short side 156, and the width is of a dimension defined as the perpendicular straight-line distance between the first long side 150 and the second long side 152. The thickness is of a dimension defined as the straight-line perpendicular distance between the first front surface 124 and the back surface 122. Where desired to do so, a keyboard slot 151 of a suitable size can be implemented in either or both of the long sides (150 or/and 152) of the case 118 to facilitate the physical connection of a physical keyboard 153 (mentioned above) to the portable computing device. Alternatively, rather than using the virtual keyboard or the physical keyboard, the case 118 and assorted slots can accommodate interfacing (e.g., via a USB (universal serial bus) port or other suitable interface) to equipment such as laser projected virtual keyboard that projects a virtual keyboard on a surface and processes user interactions on the laser projected virtual keyboard to operate as a standard keyboard and key strokes in communication with the portable computing device. In one implementation, the equipment (e.g., a pen form factor projector, block-type form factor, etc.) can be attached in a removable manner to either the clipboard 102 or an auxiliary board (described below) via the attachment mechanism or other suitable method (e.g., free standing away from the clipboard and portable computing system 100), for example, to enable stable use of the equipment and the projected virtual keyboard.

The case 118 can be designed of a suitable shape (length, width, and thickness) with specifically positioned cutouts to accommodate the given device (e.g., Tablet A from Vendor A, Tablet B from Vendor B, etc.) for which it is designed. Note that there can be specifically located cutouts on one or more of the sides (e.g., the first short side 154, the second short side 156, the first long side 150, and the second long side 152) to facilitate access to other buttons, ports (optical, mechanical, electromechanical), connections, etc., designed into the given computing device currently inserted into the case 118.

The clipboard system 100 also comprises an attachment mechanism 128 (e.g., Velcro™), which attaches the case 118 to the second face 106 of the clipboard 102. As described above, the attachment mechanism 128 can be a two-part fabric (e.g., hook and loop) such that a first part 130 of the attachment mechanism 128 is attached (e.g., glued) to the second face 106 of the clipboard 102 and the second part 132 of the attachment mechanism 128 is attached (e.g., glued, permanently secured by other techniques, mechanically attached for removability, etc.) to the back surface 122 of the case 118.

Where the case 118 does not comprise a cover 160, the attachment mechanism 128 is applied to the back surface 122 of the case 118 and the second face 106 of the clipboard 102. When the first part 130 and the second part 132 of the attachment mechanism 128 are brought (e.g., manually pressed) together in contact, the case 118 is securely affixed to the second face 106 of the clipboard 102. The user can then flip the system 100 to use either the clipboard 102 or the computing device enclosed in the case 118.

In an alternative embodiment, the case 118 also comprises the cover 160 (not fully viewable as shown) that closes over the front surface 124 in a closed position and can fold completely back (one-hundred eighty degrees from the closed position) to contact the back surface 122 of the case 118 to facilitate attachment of the case 118 to the clipboard. As described herein, the back surface 122 of the case 118 is enabled using the pivoting cover 160 (e.g., a flexible and durable material, a hinged material, etc.) that functions to pivot (close) over the display 120 of the computing device in a closed position, and then rotate (pivot) back into a fixed position to enable the inside portion of the cover 160 (as the second part 132 of the attachment mechanism 128) to interface to the first part 130 of the attachment mechanism 128, thereby attaching the computing device, while in the case 118, to the clipboard 102. This is described in greater detail herein. Thus, when the first part 130 and the second part 132 of the attachment mechanism 128 are brought (e.g., manually pressed) together in contact, the case 118 is securely affixed to the second face 106 of the clipboard 102. The user can then flip the system 100 to use either the clipboard 102 or the computing device enclosed in the case 118.

The front surface 124 of the case 118 also comprises one or more cutouts that enable user interaction with device controls that may exist on the device housing, and also enables device sensors such as a camera, microphone, etc., unimpeded access to receive and sense signals. For example, a first cutout 134 exposes a power switch 136 of the device, and a second cutout 138 exposes a camera 140. Other cutouts can be provided as described herein, such as for a power cord, flashcard insertion, tether insertion and utilization, and so on.

Figure 2:
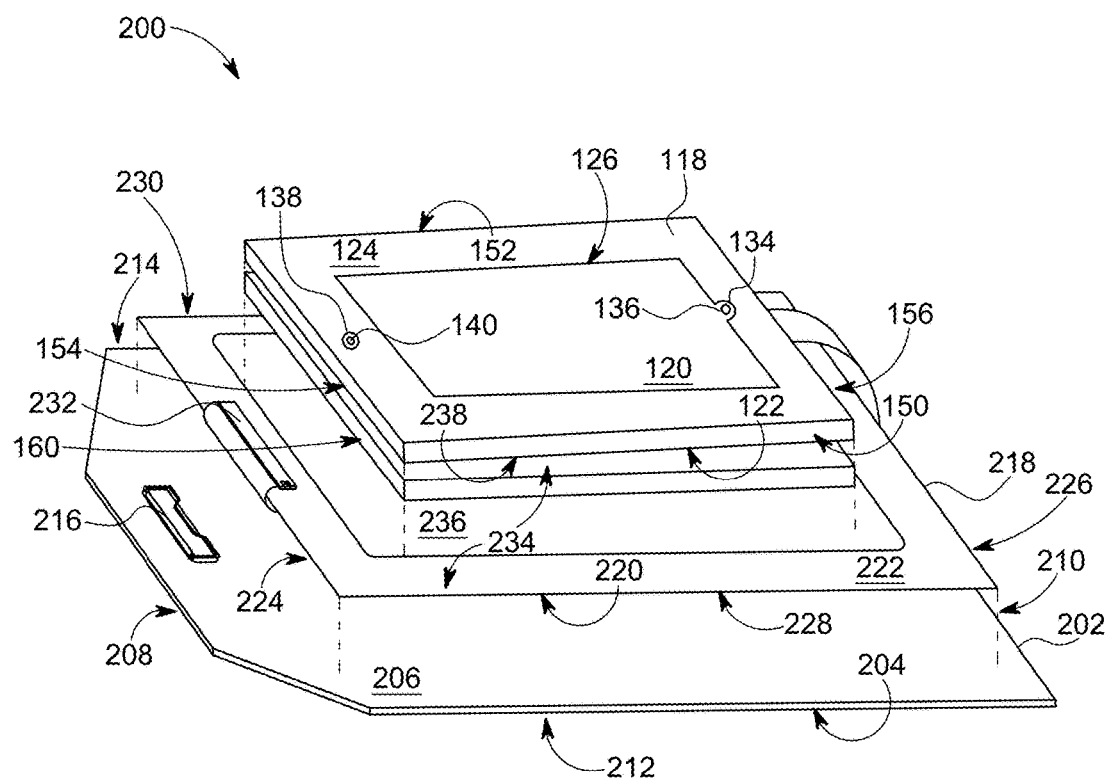
FIG. 2 illustrates an alternative embodiment of a clipboard and portable computing device system.

FIG. 2 illustrates an alternative embodiment of a clipboard and computing device system 200. The clipboard system 200 comprises a double-sided clipboard 202 having a first face 204 (shown as facing downwards) and a second face 206 (shown as facing upwards), a top edge 208, a bottom edge 210, a first side edge 212, a second side edge 214, and a backside clipping apparatus 216 affixed near the top edge 208 of the second face 206.

The case 118 for a portable computing device such as a tablet computer receives and encloses the portable computing device (showing only the device display 120). The case 118 comprises the back surface 122 (or cover 160 facing downward toward the second face 206 of the double-sided clipboard 202), the front surface 124 that opposes the back surface 122 and exposes the viewing portion 126 as a cutout in the front surface 124 that is sufficiently large and shaped to expose the device display 120 and via which the device display 120 of the device is viewed. The case 118 can also, optionally, comprise the cover 160 (not fully viewable as shown) that closes over the front surface 124.

As before, the front surface 124 of the case 118 also comprises one or more cutouts through which the user is enabled to interact with device controls that may exist on the device housing of the computing device, and also enables device sensors such as a camera, microphone, etc., unimpeded access to, send, receive, and/or sense signals. For example, the first cutout 134 exposes a power switch 136 of the device, and a second cutout 138 exposes a camera 140. Other cutouts can be provided as described and shown hereinbelow, such as for a power cord, flashcard insertion, tether insertion and utilization, and so on.

The clipboard system 200 further comprises an auxiliary board 218 having a first auxiliary face 220 (shown as facing downward to the double-sided clipboard 202) and a second auxiliary face 222 (shown as facing upward toward the case 118), an auxiliary top edge 224, an auxiliary bottom edge 226, a first auxiliary side edge 228, a second auxiliary side edge 230, and an auxiliary board clipping apparatus 232 affixed near the auxiliary top edge 224 of the second auxiliary face 222.

The clipboard system 200 also comprises an attachment mechanism 234 (e.g., Velcro™), which attaches the back surface 122 of the case 118 to the second auxiliary face 222 of the auxiliary board 218. Similar to the attachment mechanism 128 in FIG. 1, the attachment mechanism 234 can be a two-part fabric (e.g., hook and loop) such that a first part 236 is permanently or removably affixed to the second auxiliary face 222 of the auxiliary board 218 and the second part 238 is permanently or removably affixed to the back surface 122 of the case 118. Thus, when the first part 236 and the second part 238 are brought (e.g., manually pressed) together, the case 118 is securely affixed to the second auxiliary face 222 of the auxiliary board 218. The auxiliary board 218 then affixes to the second face 206 of the double-sided clipboard 202, with the first auxiliary face 220 in contact with the second face 206 of the double-sided clipboard 202.

Additionally, the auxiliary board 218 pivotally attaches to the double-sided clipboard 202 near the top edge 208 of the clipboard 202 and near the auxiliary top edge 224 of the auxiliary board 218. The auxiliary board 218 can be affixed to the double-sided clipboard 202 using a fastening apparatus (not shown, but snaps, for example) near the auxiliary bottom edge 226 and the clipboard bottom edge 210 to securely attach the auxiliary board 218 to the second face 206 of the clipboard 202.

It is to be appreciated what while the description focuses on the combination of the single-sided or double-sided clipboards, auxiliary board, case, and portable computing device as a single productivity unit, the single-sided clipboard and double-sided clipboard can each be used independently as clipboards without the case and portable computing device attached. Similarly, the portable computing device and case can be used in a detached mode as such devices may typically be used without the clipboard(s) and auxiliary board attached.

FIGS. 3-21 illustrate additional aspects of the clipboard and portable computing device system.

Figure 3:
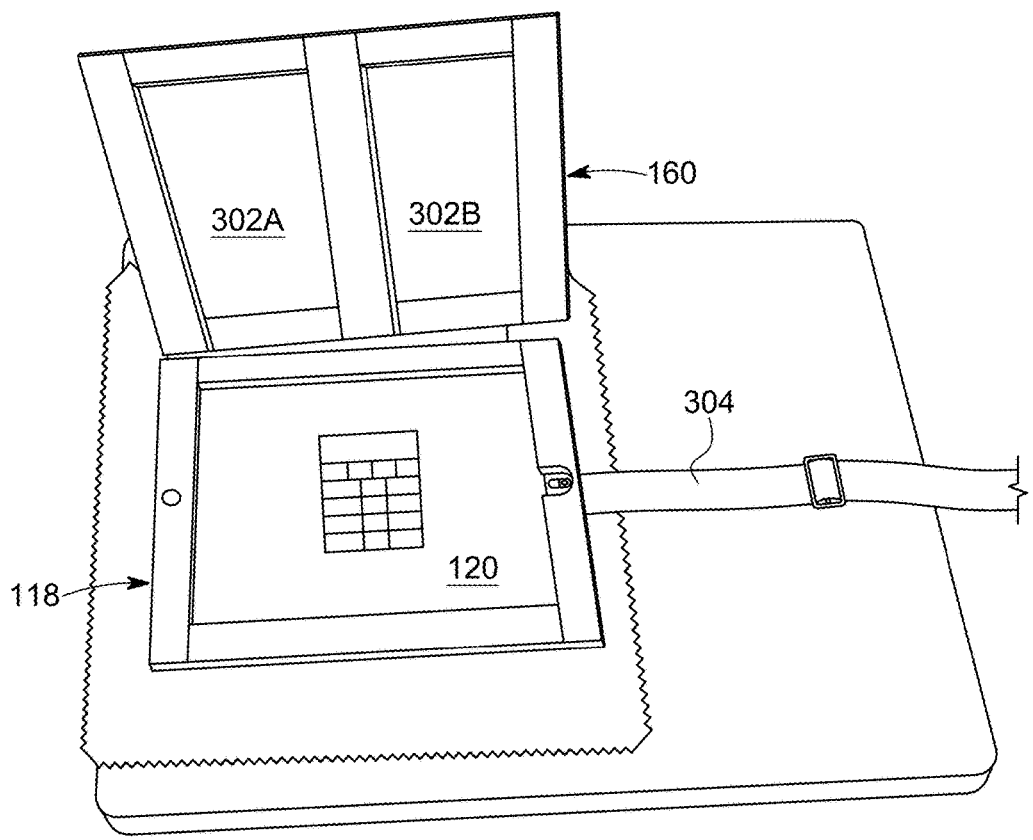
FIG. 3 illustrates the case and viewing portion that exposes the display.

FIG. 3 illustrates the case 118 and viewing portion 126 that exposes the display 120. The case 118 comprises the cover 160 that when in a closed position covers the device display 120 to mitigate damage to the device display 120 such as from scratches and shock (e.g., dropping). The inside attachment portions (302A and 302B) of the cover 160 comprise one part (the second part 132) of the two-part attachment mechanism 128, such that when the cover 160 is folded (pivoted) completely in a back position (contacting the back of the case 118), the inside attachment portions (302A and 302B) of the cover 160 attach to the first part 130 of the attachment mechanism on the second face 106 of the clipboard 102. The case 118 can be carried using a tether 304 that interfaces (is captured on one end) to the inside of the case 118.

Figure 4:
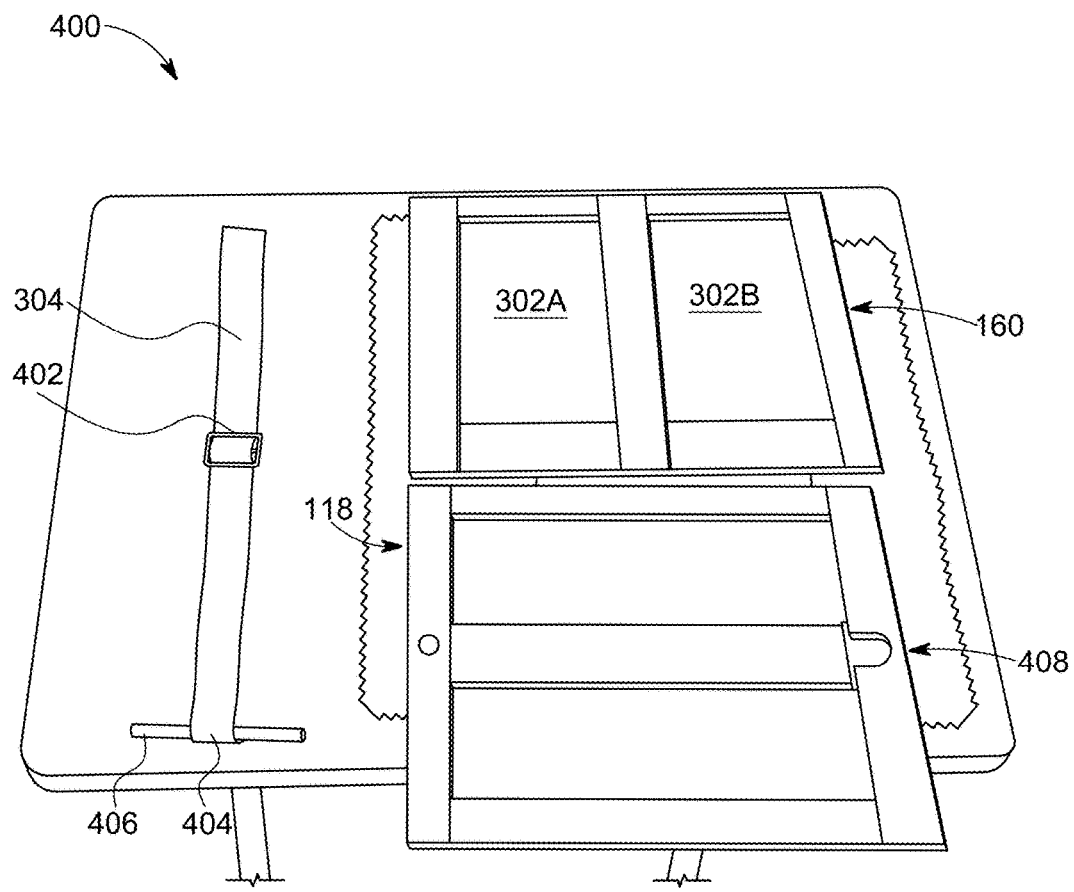
FIG. 4 illustrates the case in a partially open position without a portable computing device supported therein.

FIG. 4 illustrates the case 118 in a partially open position 400 without a computing device supported therein. The inside attachment portions (302A and 302B) of the cover 160 are shown as comprising two separate sections of the second part 132 (on the back surface 122 of the case 118) of the attachment mechanism 128. The tether 304 is loosely coupled to the case 118 using one end and can be made adjustable using an adjustment buckle 402. The one end of the tether 304 comprises a strap end loop 404 inserted through a slot 408 in the case 118 and coupled to the case 118 using a capture rod part 406 inserted through the strap end loop 404 to prevent removal of the strap end loop 404 through the slot 408. The tether 304 then enables handling of the case 118 separately, and the computing device/clipboard system as a productivity unit. As indicated herein, the case 118 can include multiple slots similar to slot 408 along the periphery (or sides) of the case 118 to enable capture and use of the tether 304 from the different slot locations along the periphery.

Figure 5:
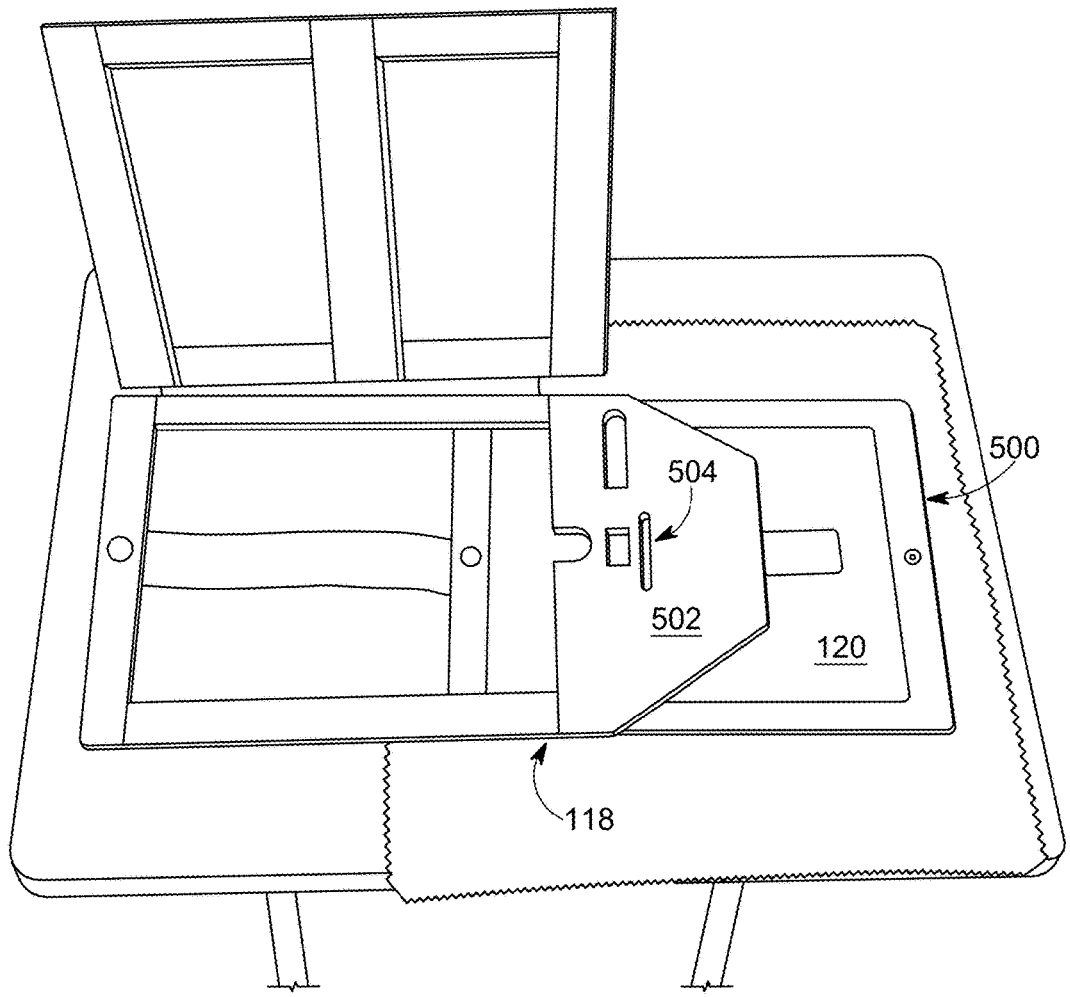
FIG. 5 illustrates the portable computing device partially inserted into the case.

FIG. 5 illustrates the computing device 500 partially inserted into the case 118. An outside view of folding portion 502 of the case 118 enables insertion of the computing device 500 into the case 118 and depicts a slot 504 through which the strap end loop 404 of the tether 304 is inserted to be captured in the case 118, a power button cutout, and other cutouts for direct user engagement of other buttons of the computing device 500 and the device display 120 (e.g., a touch display) while fully inserted into the case 118.

Figure 6:
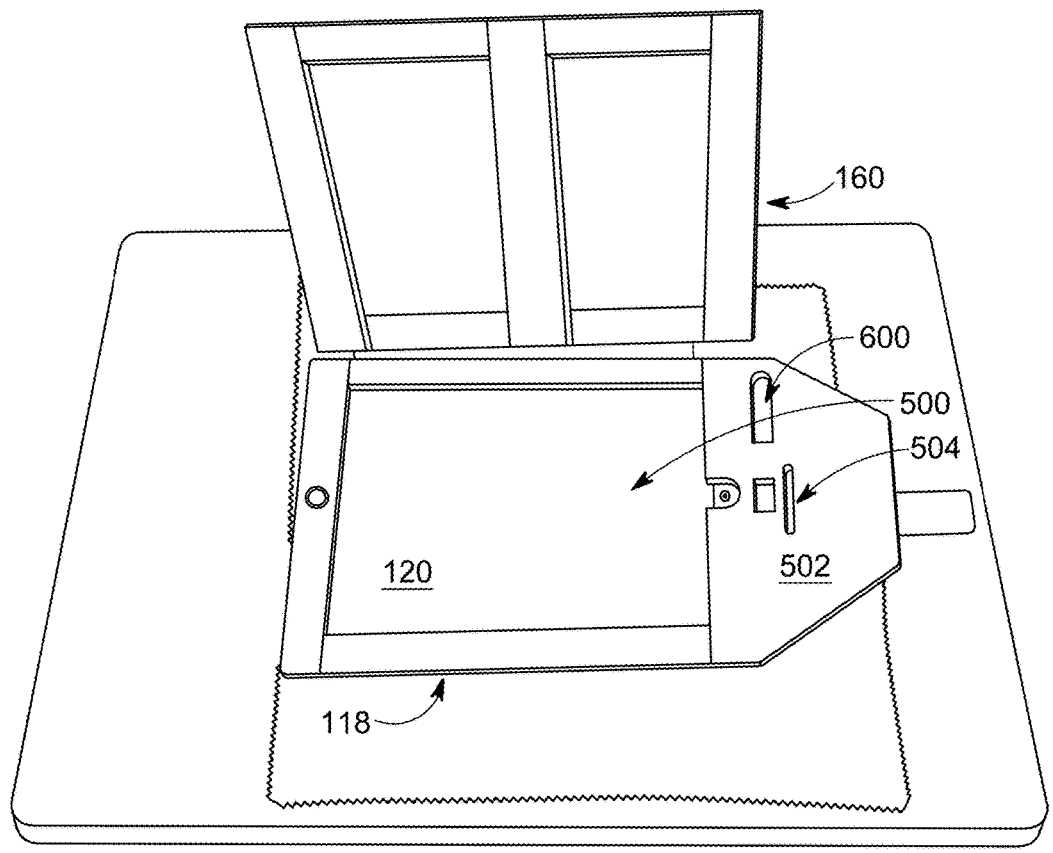
FIG. 6 illustrates the portable computing device fully inserted into the case.

FIG. 6 illustrates the computing device 500 fully inserted into the case 118. The folding portion 502 of the case 118 depicts the slot 504 through which the strap end loop 404 of the tether 304 is inserted to be captured in the case 118, a power button cutout 600, and other cutouts for direct user engagement of other buttons of the device while fully inserted into the case 118.

Figure 7:
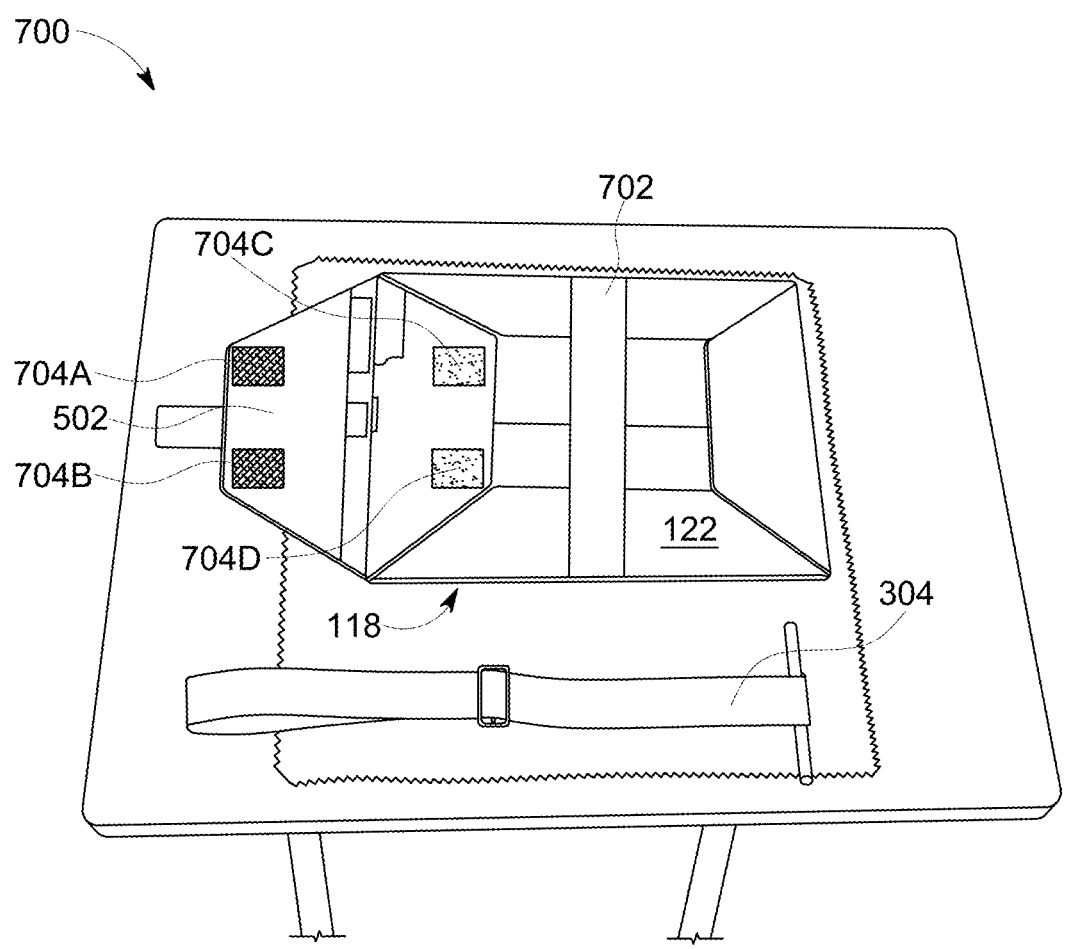
FIG. 7 illustrates a rear view of the case when the portable computing device is fully inserted into the case and the unfolded portion in the open position.

FIG. 7 illustrates a rear view 700 of the case 118 when the computing device is fully inserted into the case 118 and the folding portion 502 in the open position. In the rear view 700, the cover 160 of the case 118 is in the closed position, which covers the display; hence, the cover 160 cannot be viewed. In this embodiment of the case 118 and cover 160 for the case 118, the backside of the case 118 comprises a cover strap 702 that folds (across) between the inside attachment portions (302A and 302B) of the cover 160, when the cover 160 is in the fully open position (folded back onto (against) the back surface 122 of the case 118). Here, since the cover 160 is folded over the viewing portion 126 of the case 118, the cover strap 702 (a hook-and-loop design) is simply secured to the back surface 122 of the case 118 using, for example, Velcro™.

The cover strap 702 not only secures the cover 160 against the back surface 122 of the case 118, but also comprises attachment material (e.g., a Velcro™ part) on the outward facing side of the cover strap 702 such that not only the two separate inside attachment portions (302A and 302B) of the inside part of the cover 160 facilitate attachment, but also the strap 702 itself.

The inside view of the folding portion 502 can include two separate attachment portions (704A and 704B) (e.g., Velcro™) such that when the folding portion 502 is folded into the closed position against the back surface 122 of the case 118, the attachment portions (704A and 704B) of the folding portion 502 mate to attachment portions (704C and 704D) on the back surface 122 of the case 118 to close the opening in which the computing device is inserted thereby securely capturing the computing device in the case 118.

Figure 8:
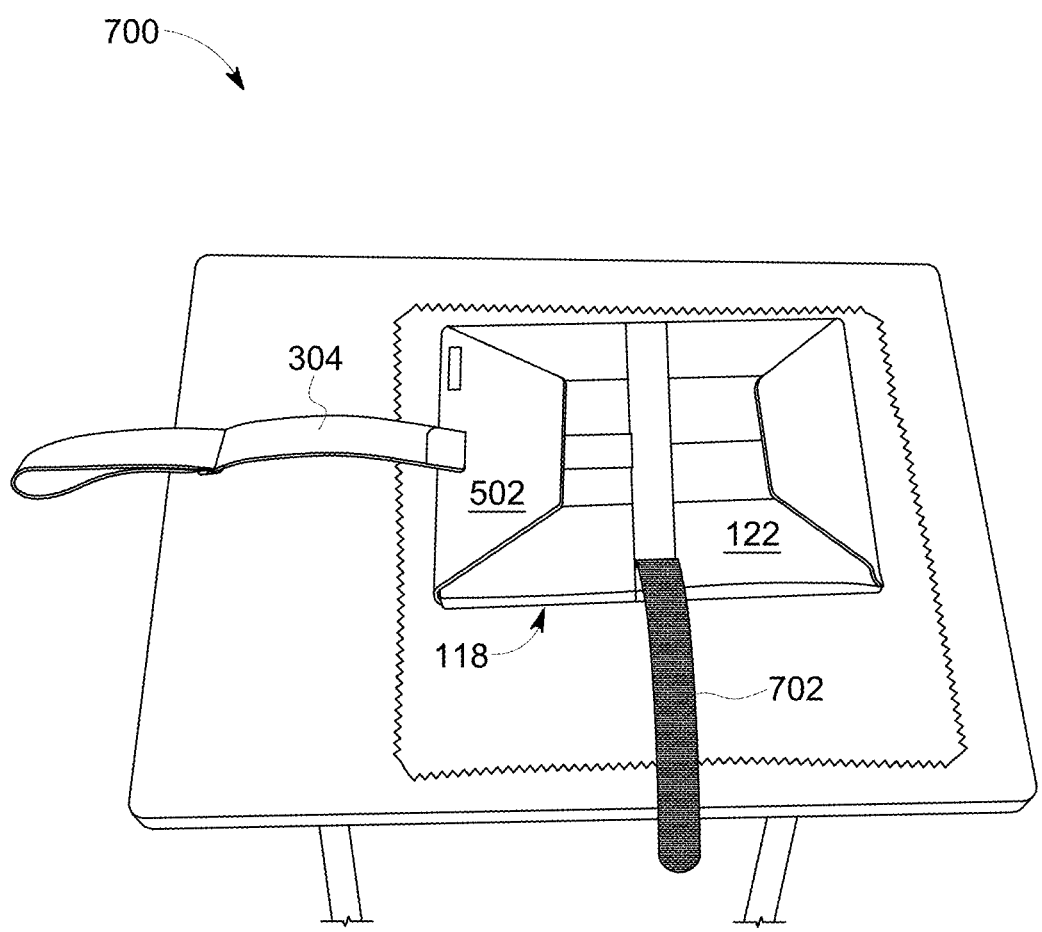
FIG. 8 illustrates the rear view of the case when the portable computing device is fully inserted into the case and the unfolded portion in the closed position.

FIG. 8 illustrates the rear view 700 of the case 118 when the computing device is fully inserted into the case 118 and the folding portion 502 in the closed position. In this depiction, the cover 160 of the case 118 is in the closed position, which covers the viewing portion 126 through which the device display is exposed; however, since from the perspective of the rear view 700, the cover 160 cannot be viewed.

The back surface 122 of the case 118 comprises the cover strap 702 that folds over the cover 160 between the two separate inside attachment portions (302A and 302B), when the cover 160 is in the fully open position (folded back onto the backside of the case 118). The cover strap 702 is shown in a laid open position. The cover strap 702 not only secures the cover 160 to the backside of the case 118, but also comprises attachment material (e.g., Velcro) on the outward facing side of the cover strap 702 such that not only the two separate attachment portions (302A and 302B) of the inside of the cover 160 facilitate attachment, but also the strap 702 itself. The tether 304 is also shown as captured on one end of the case 118.

Figure 9:
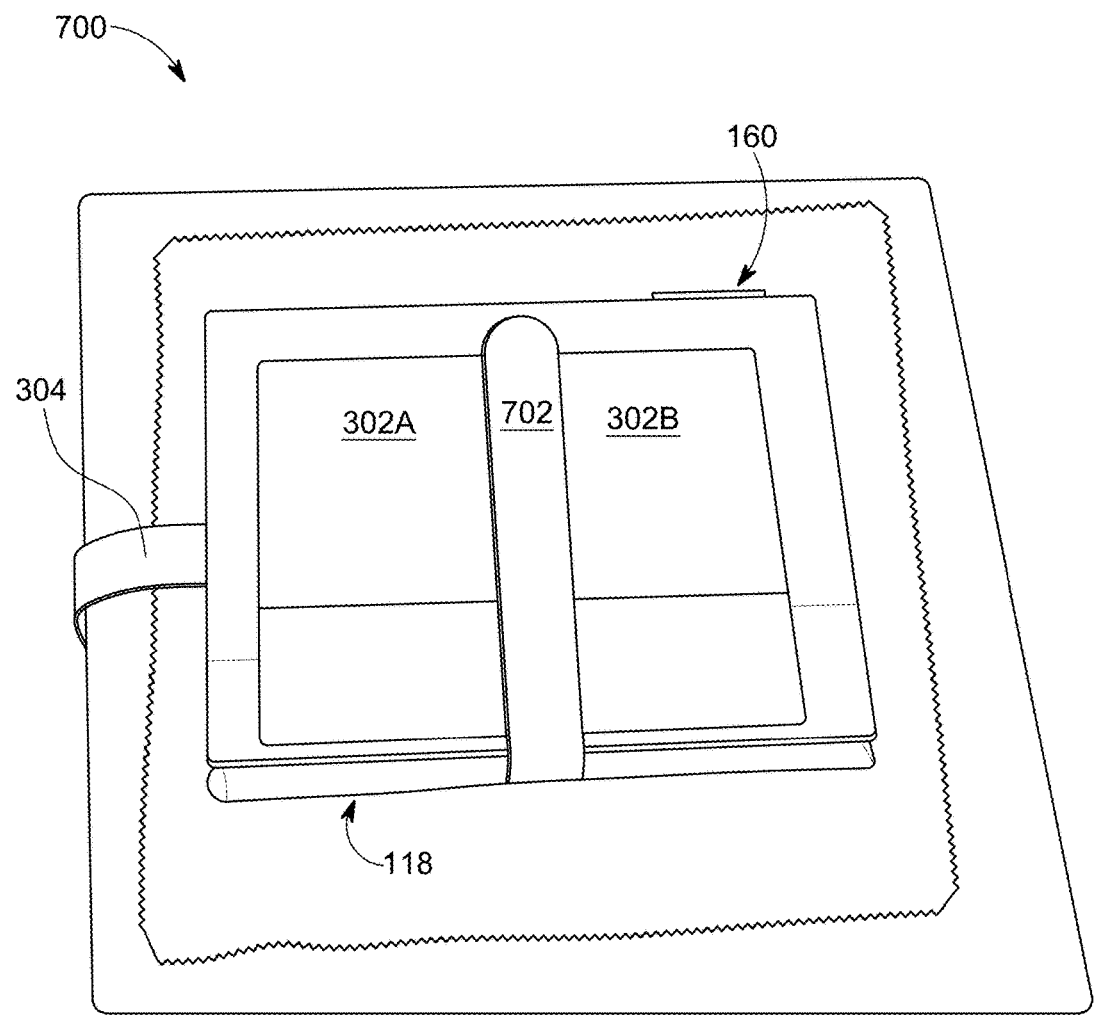
FIG. 9 illustrates the rear view of the case when the portable computing device is fully inserted into the case and the cover is in the fully open position against the back surface of the case.

FIG. 9 illustrates the rear view 700 of the case 118 when the computing device is fully inserted into the case 118 and the cover 160 is in the fully open position against the back surface 122 of the case 118. The rear view 700 of the case 118 comprises the cover strap 702 folded "over" (between) the two separate inside attachment portions (302A and 302B) of the cover 160. The cover strap 702 is shown in a fully closed position to secure the cover 160 against the back surface 122 of the case 118. The cover strap 702 not only secures the cover 160 against the backside of the case 118, but also comprises attachment material (e.g., Velcro) on the outward facing side of the cover strap 702 such that not only the two separate attachment portions (302A and 302B) on the inside of the cover 160 facilitate attachment (to the clipboard), but also the strap 702 itself. The tether 304 is also shown as interfaced to the case 118.

The two separate inside attachment portions (302A and 302B) and cover strap 702 are pressed to the first part 236 of the auxiliary board 218 to secure the case 118 thereto. The two separate inside attachment portions (302A and 302B) and cover strap 702 serve as the second part 238 of the attachment mechanism 234 that secures the case 118 to the auxiliary board 218.

Note that where the case 118 does not comprise the cover 160, the two separate inside attachment portions (302A and 302B) can be applied directly to the back surface 122 of the case 118. In this coverless implementation, the cover strap 702 would not be needed.

Figure 10:
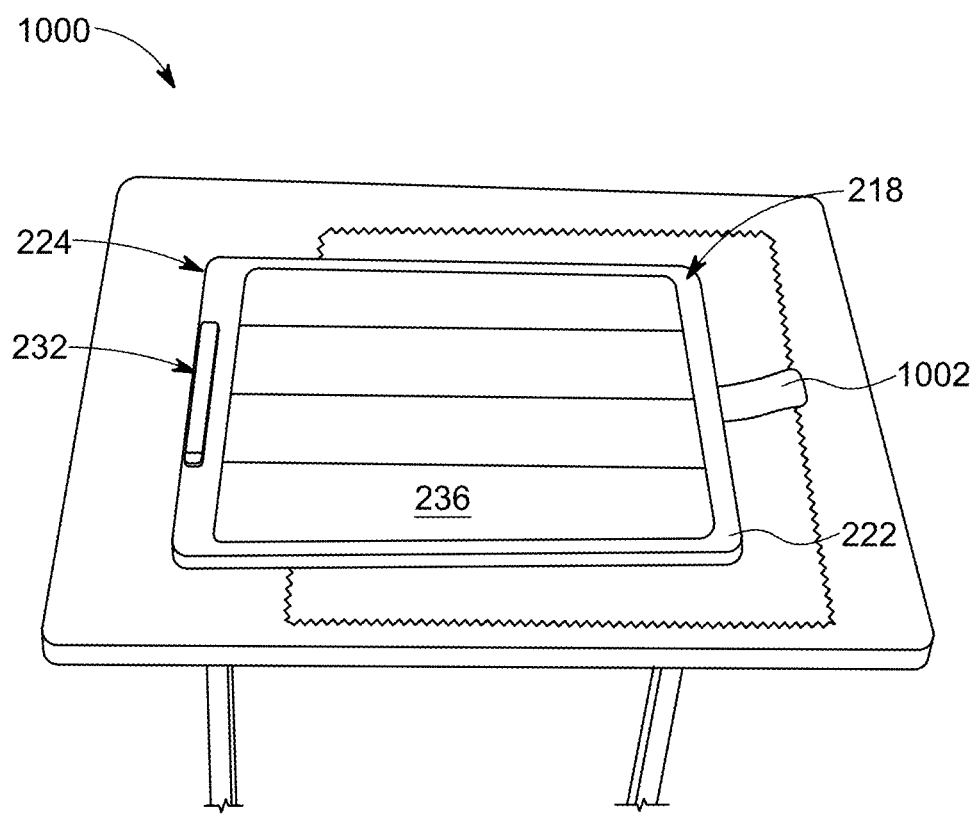
FIG. 10 illustrates a top view of the auxiliary board.

FIG. 10 illustrates a top view 1000 of the auxiliary board 218. The auxiliary board 218 comprises the first part 236 of the attachment mechanism 234 (of FIG. 2) and the auxiliary board clipping apparatus 232 affixed near the auxiliary top edge 224 of the second auxiliary face 222 of the auxiliary board 218. Here, the auxiliary board clipping apparatus 232 can be a plastic bar properly sized and strategically affixed (e.g., permanently affixed, fastened, etc.) to the auxiliary board 218 to enable engagement and capture by the backside clipping apparatus 216 of the double-sided clipboard 202 (not shown here). The auxiliary board 218 can also comprise a board strap 1002 that enhances user handling of the auxiliary board 218.

Figure 11:
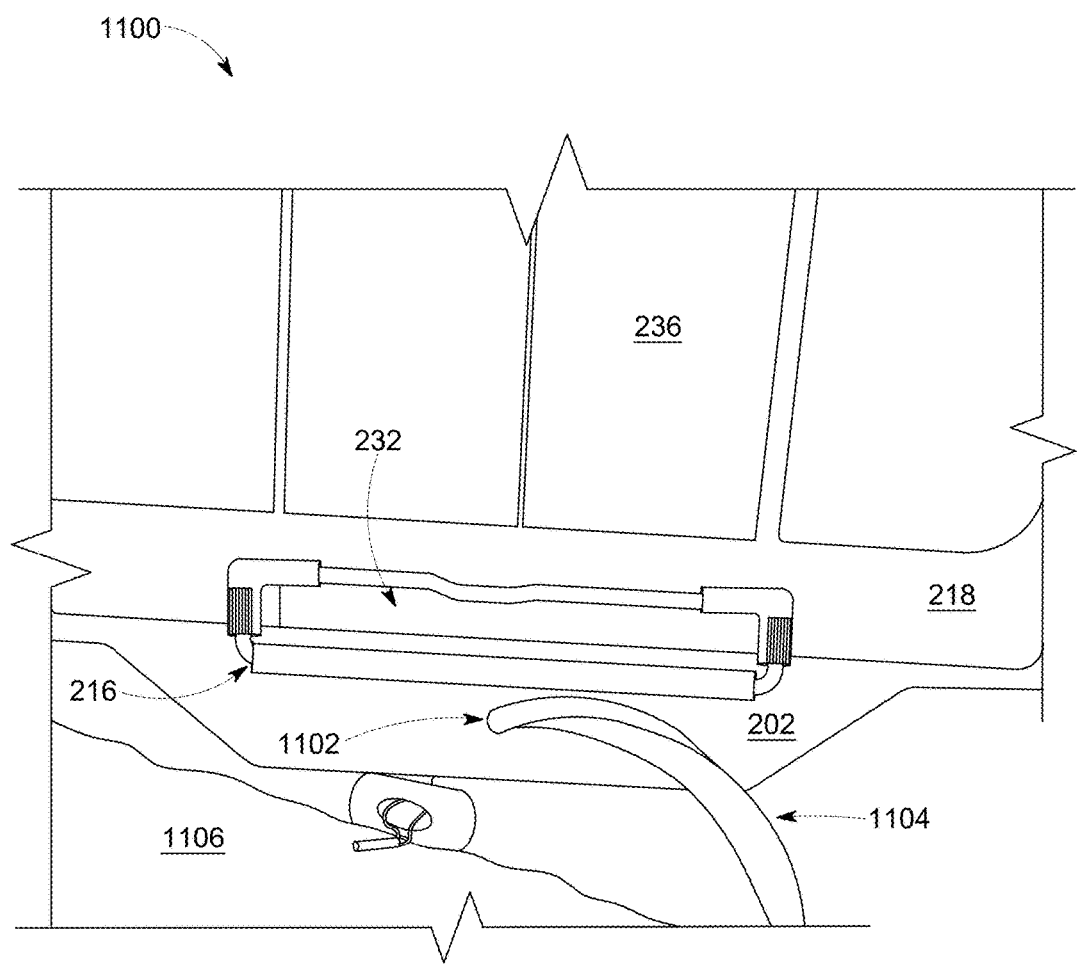
FIG. 11 illustrates a close-up view of secure engagement and capture of the auxiliary board by the clipping apparatus of the double-sided clipboard.

FIG. 11 illustrates a close-up view 1100 of secure engagement and capture of the auxiliary board 218 by the backside clipping apparatus 216 of the double-sided clipboard 202. Note that the double-sided clipboard 202 also comprises a bag hole 1102 for loosely coupling a bag loop 1104 of a utility bag 1106 to the double-sided clipboard 202. When not coupling the utility bag 1106 to the clipboard 202, the bag hole 1102 can be used to hang the clipboard 202 and all attached components, on a peg (e.g., on a wall). The auxiliary board clipping apparatus 232 is captured by the backside clipping apparatus 216 of the double-sided clipboard 202.

Figure 12:
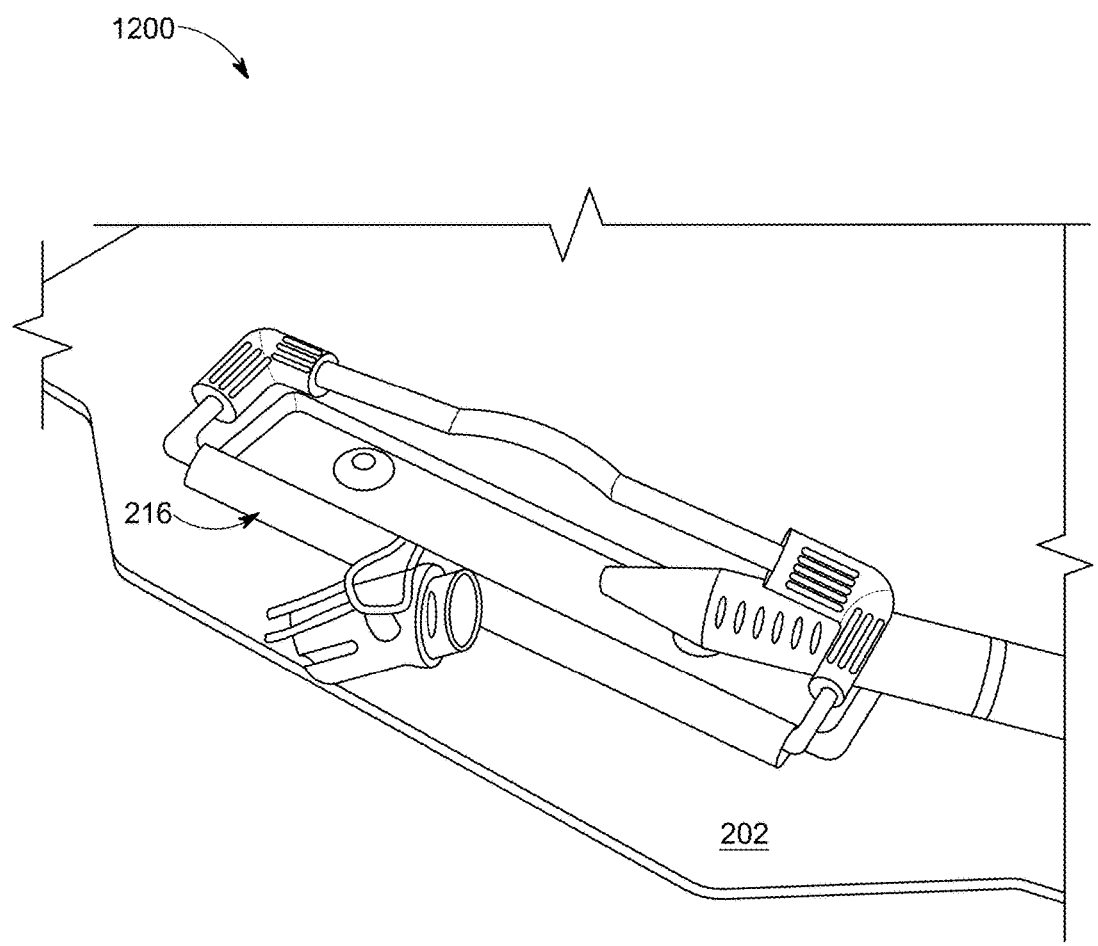
FIG. 12 illustrates an oblique close-up view of the clipping apparatus of the double-sided clipboard showing the clipping apparatus affixed to one side of the double-sided clipboard in a partially-opened position.

FIG. 12 illustrates an oblique close-up view 1200 of the clipping apparatus 216 of the double-sided clipboard 202 showing the backside clipping apparatus 216 affixed to one side of the double-sided clipboard 202 in a partially-opened and spring-loaded position.

Figure 13:
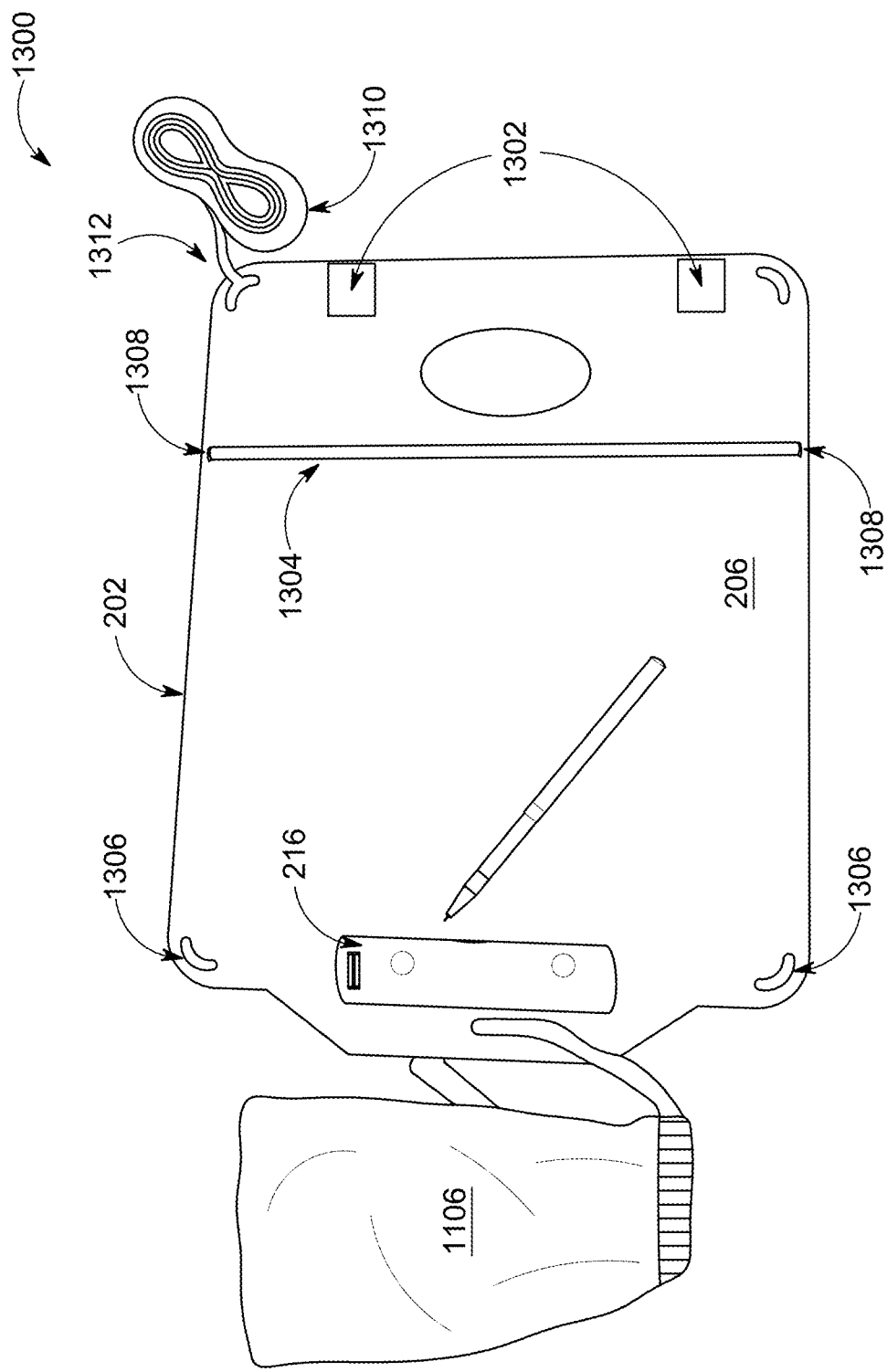
FIG. 13 illustrates a backside view of the double-sided clipboard.

FIG. 13 illustrates a backside view 1300 of the double-sided clipboard 202 of FIG. 2. The double-sided clipboard 202 comprises clipping apparatuses 216 on each side (the first face 204 and the second face 206) to enable capture of the auxiliary board 218 to one side (the second face 206) and documents, papers, to the other side (the first face 204).

Accordingly, on the second face 206, the double-sided clipboard 202 comprises the backside clipping apparatus 216, supplemental attachment apparatus 1302 (e.g., pieces of Velcro) for engaging the first auxiliary face 220 of the auxiliary board 218 to the double-sided clipboard 202, and an elastic strap 1304 that circumscribes the double-sided clipboard 202 for holding documents to the first face 204 of the double-sided clipboard 202. The elastic strap 1304 is applied to the double-sided clipboard 202 in elastic strap slots 1308 (c-shaped notches). The double-sided clipboard 202 also comprises corner slots 1306 for coupling other items to the double-sided clipboard 202, as desired. The utility bag 1106 is shown as coupled to the auxiliary board 202, as well as a carrying shoulder strap 1310 coupled via one of the corner slots 1306 using a shoulder strap clip 1312.

Figure 14:
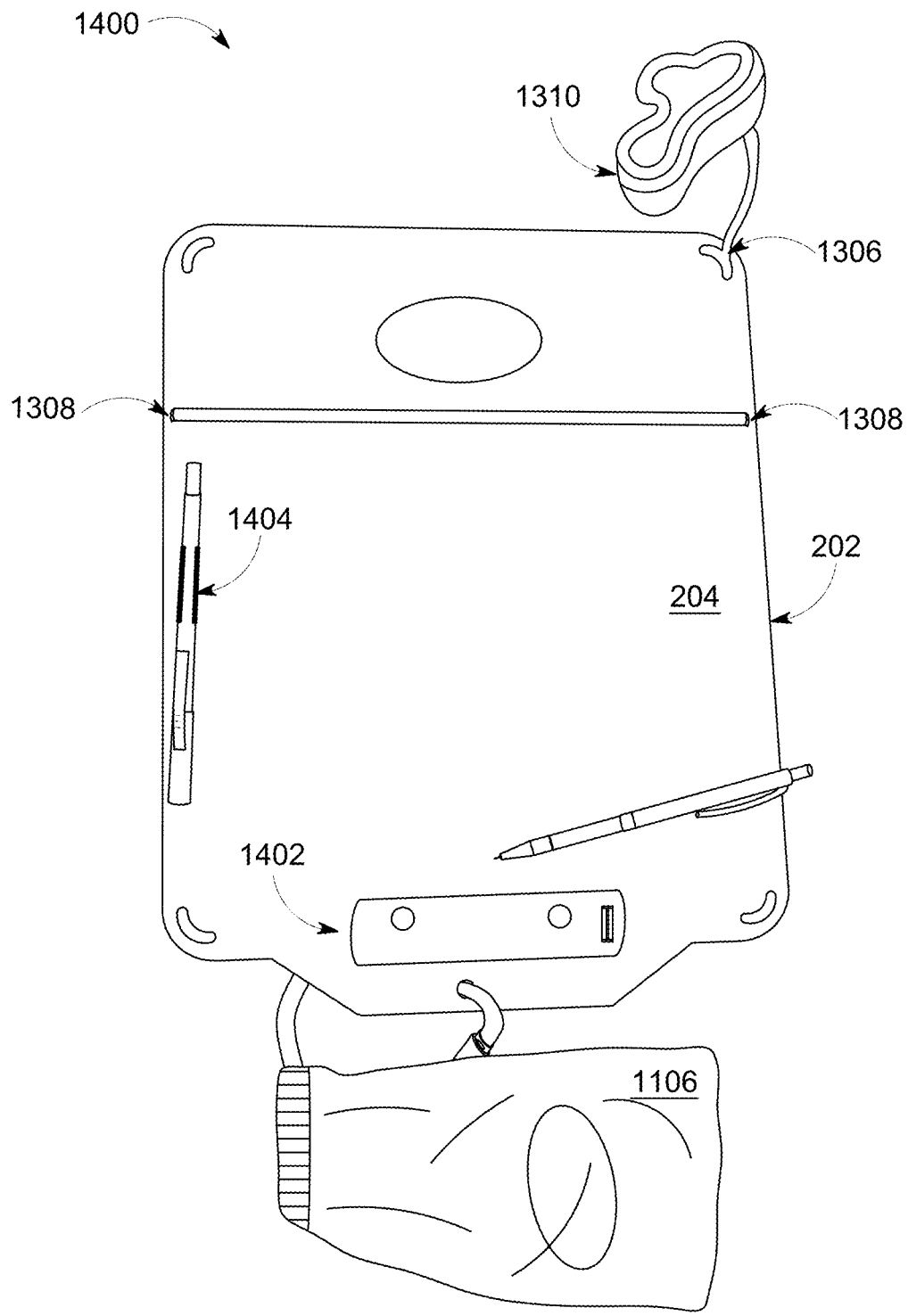
FIG. 14 illustrates a frontside view of the first face of the double-sided clipboard.

FIG. 14 illustrates a frontside view 1400 of the first face 204 of the double-sided clipboard 202. In this example, the double-sided clipboard 202 comprises a frontside clipping apparatus 1402 located on the first face 204 (or frontside) of the double-side clipboard 202, the coupled-to utility bag 1106, the elastic strap 1308 to secure paper pads and/or other documents, and the carrying strap 1310 coupled to the double-sided clipboard 202 via one of the corner slots 1306.

The utility bag 1106 is removable as the user chooses to use or not use it. The first face 204 of the double-sided clipboard 202 can also comprise a writing instrument clipping means 1404 that enables securement of a pen, pencil or any other writing apparatus, for example, for easy access and replacement during use thereof.

The frontside clipping apparatus 1402 can be mounted in the same location on the first face 204 as the backside clipping apparatus 216 is on the second face 206; hence, directly opposite each other on the respective sides of the clipboard 202. Alternatively, the frontside clipping apparatus 104 and backside clipping apparatus 216 can be located at opposite ends of the double-sided clipboard 202.

Figure 15:
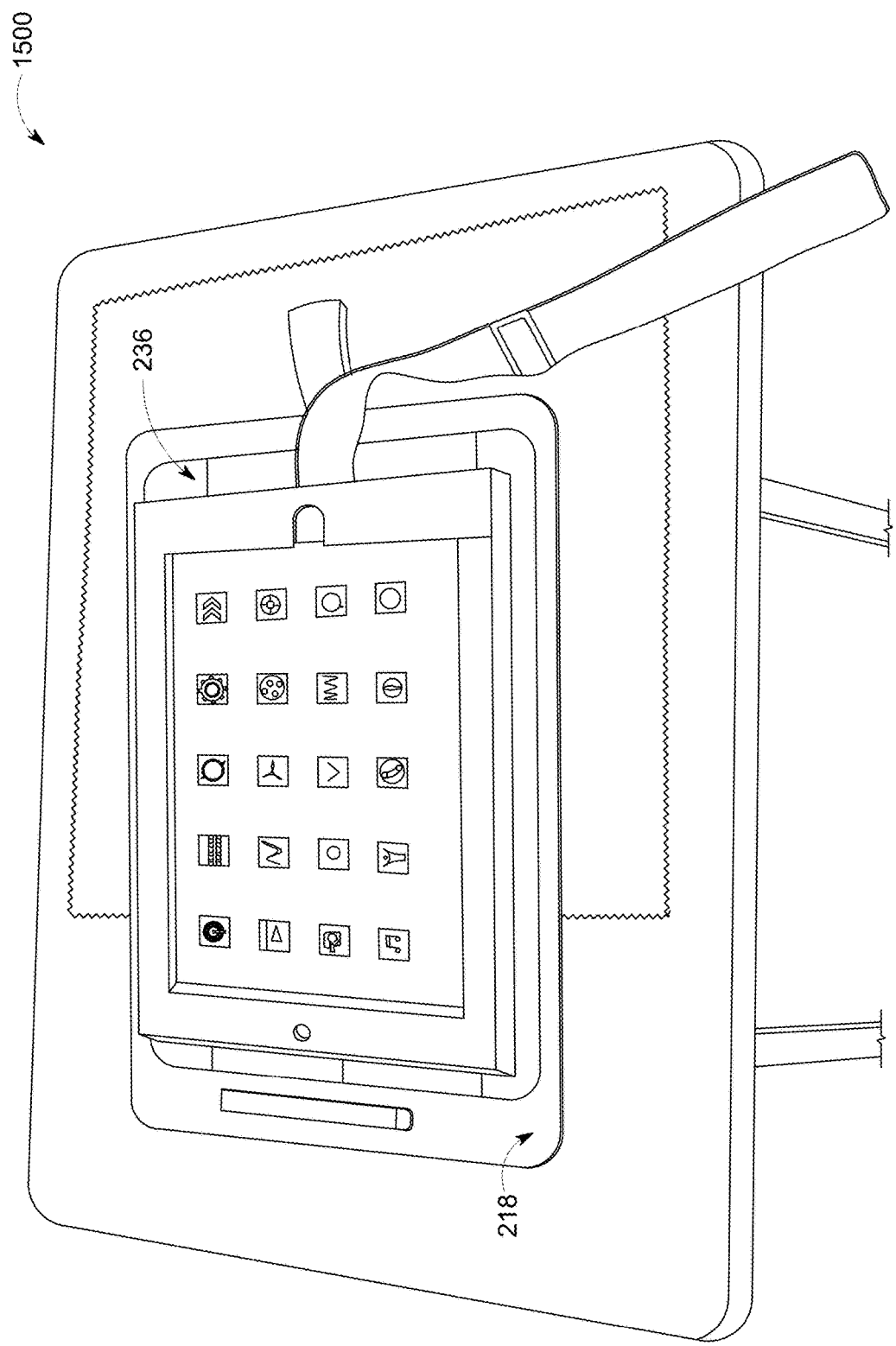
FIG. 15 illustrates a frontal view of the case and installed portable computing device as attached to the auxiliary board.

FIG. 15 illustrates a frontal view 1500 the case 118 and installed computing device as attached to the auxiliary board 218. In this view 1500, the case cover 160 (out of view) is folded back into the fully open position as shown in the rear view 700 of FIG. 9. The two separate inside attachment portions (302A and 302B) and cover strap 702 are pressed to the first part 236 of the auxiliary board 218 to secure the case 118 thereto. The two separate inside attachment portions (302A and 302B) and cover strap 702 serve as the second part 238 of the attachment mechanism 234 that secures the case 118 to the auxiliary board 218. As previously indicated, where the case 118 does not comprise the cover 160, the two separate inside attachment portions (302A and 302B) can be applied directly to the back surface 122 of the case 118, and the case 118 is then pressed against the first part 236 of the attachment mechanism 234 of the auxiliary board 218.

Figure 16:
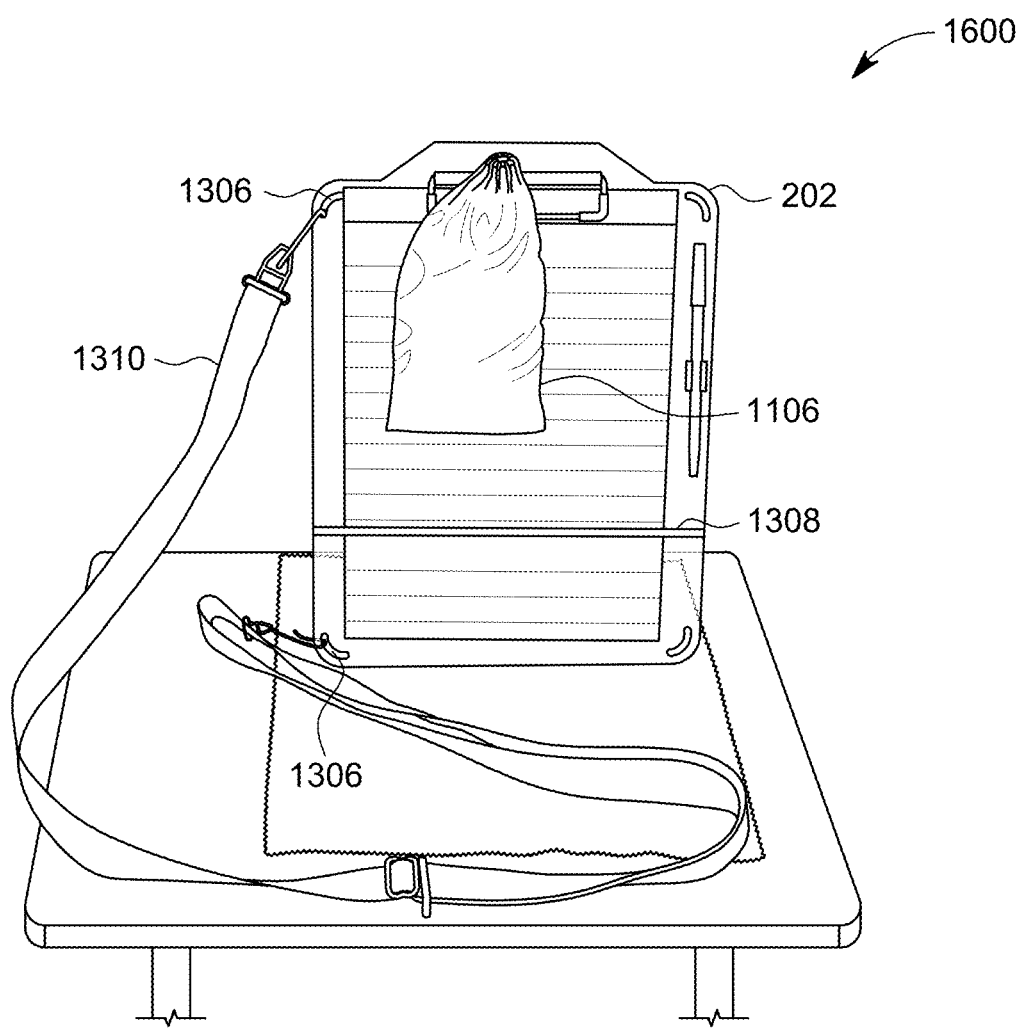
FIG. 16 illustrates a frontal view of the double-sided clipboard with a pad of paper clamped to the double-sided clipboard and the carrying strap.

FIG. 16 illustrates a frontal view 1600 of the double-sided clipboard 202 with a pad of paper clamped to the double-sided clipboard 202 and further secured by the elastic strap 1308, the coupled utility bag 1106, and the carrying strap 1310 coupled (e.g., using coupling clips) on both ends to corresponding corner slots 1306 for carrying (e.g., hanging) the clipboard system over/on the user's the shoulder.

Figure 17:
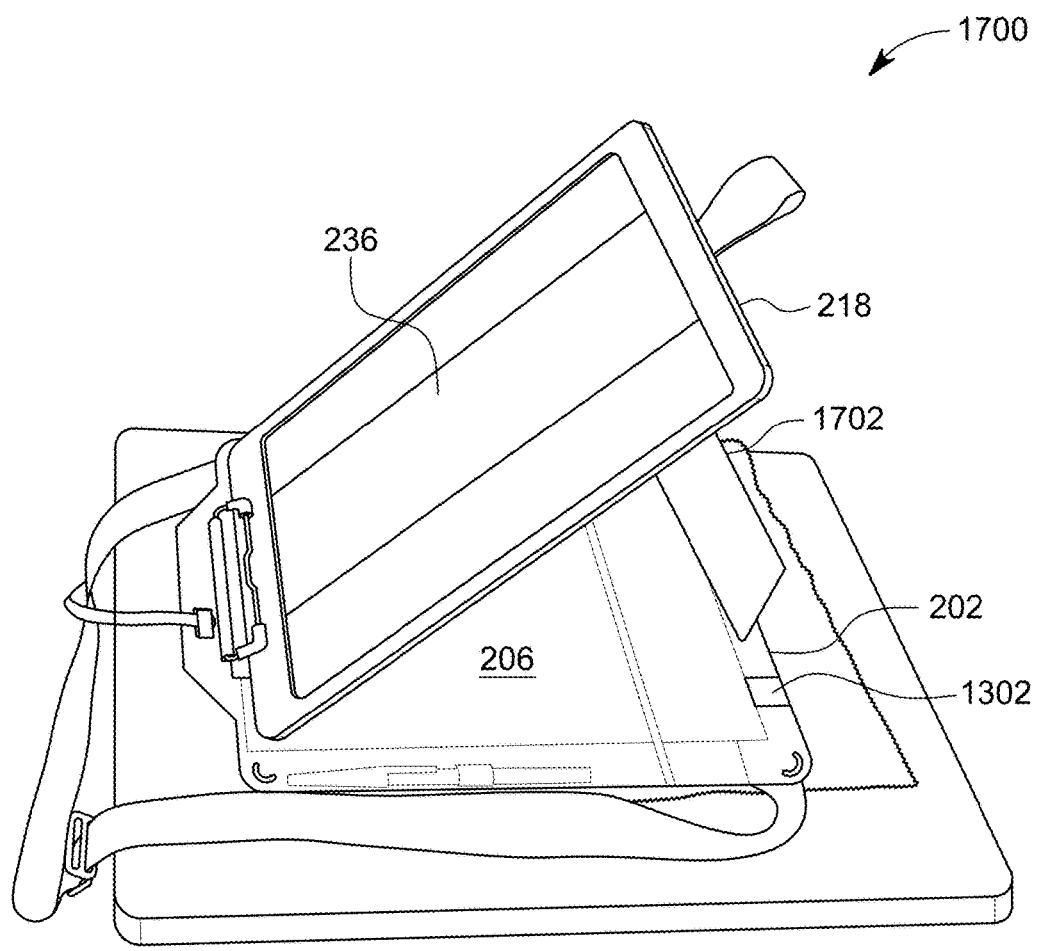
FIG. 17 illustrates a view of the auxiliary board in a clamped position and pivoted upward in a tilted angle.

FIG. 17 illustrates a view 1700 of the auxiliary board 218 in a clamped position and pivoted upward in a tilted angle. The auxiliary board 218 can be propped up in the tilted position using a propping member 1702 to enable convenient viewing and user interaction with device display and the attached computing device. One of the supplemental attachment apparatus 1302 is shown, which facilitates attachment of the first auxiliary face 220 (the back of the auxiliary board 218) to the second face 206 of the double-sided clipboard 202.

Figure 18:
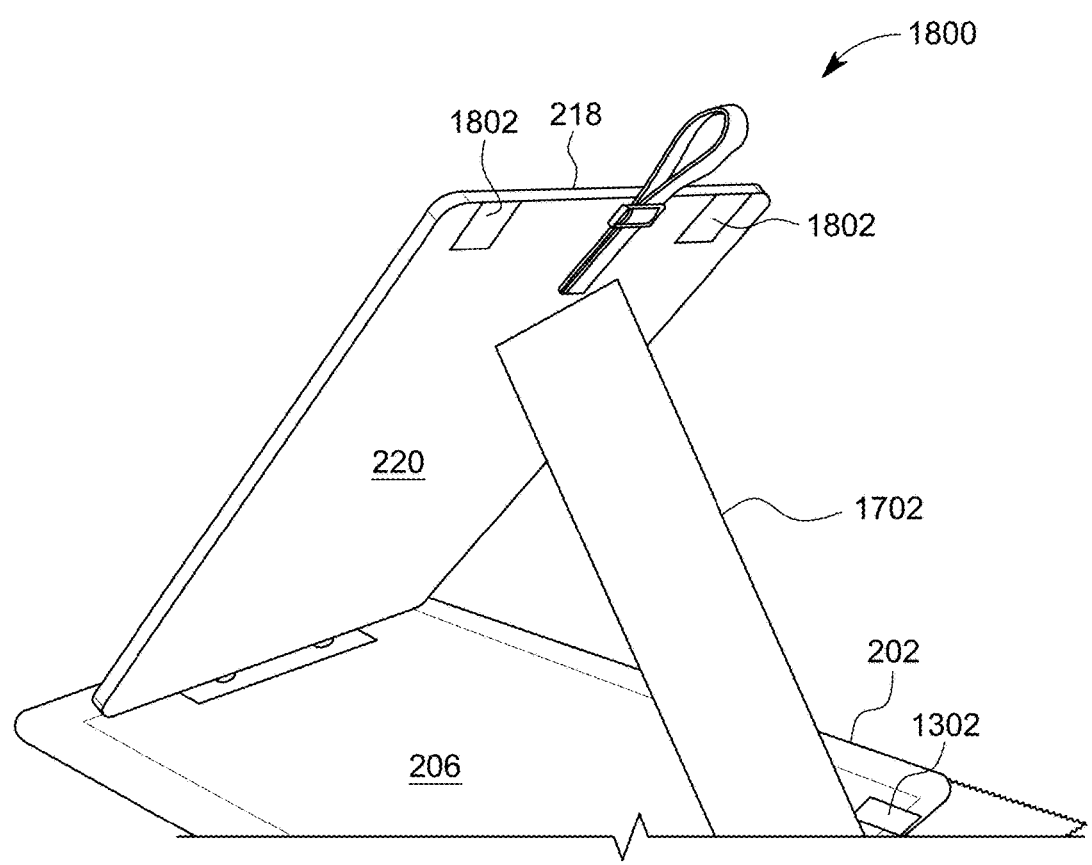
FIG. 18 illustrates a backside view of the auxiliary board in the tilted position using the propping member.

FIG. 18 illustrates a backside view 1800 of the auxiliary board 218 in the tilted position using the propping member 1702. The first auxiliary face 220 of the auxiliary board 218 comprises mating supplemental attachment apparatus 1802 (e.g., Velcro) that interfaces to the supplemental attachment apparatus 1302 (e.g., Velcro) of the second face 206 of the double-sided clipboard 202. The auxiliary board 218 can be relaxed back to the fixed position (in contact with the double-sided clipboard 202), from the tilted position, for more secured carrying and usage of the clipboard and portable computing device system 200 of FIG. 2.

Figure 19:
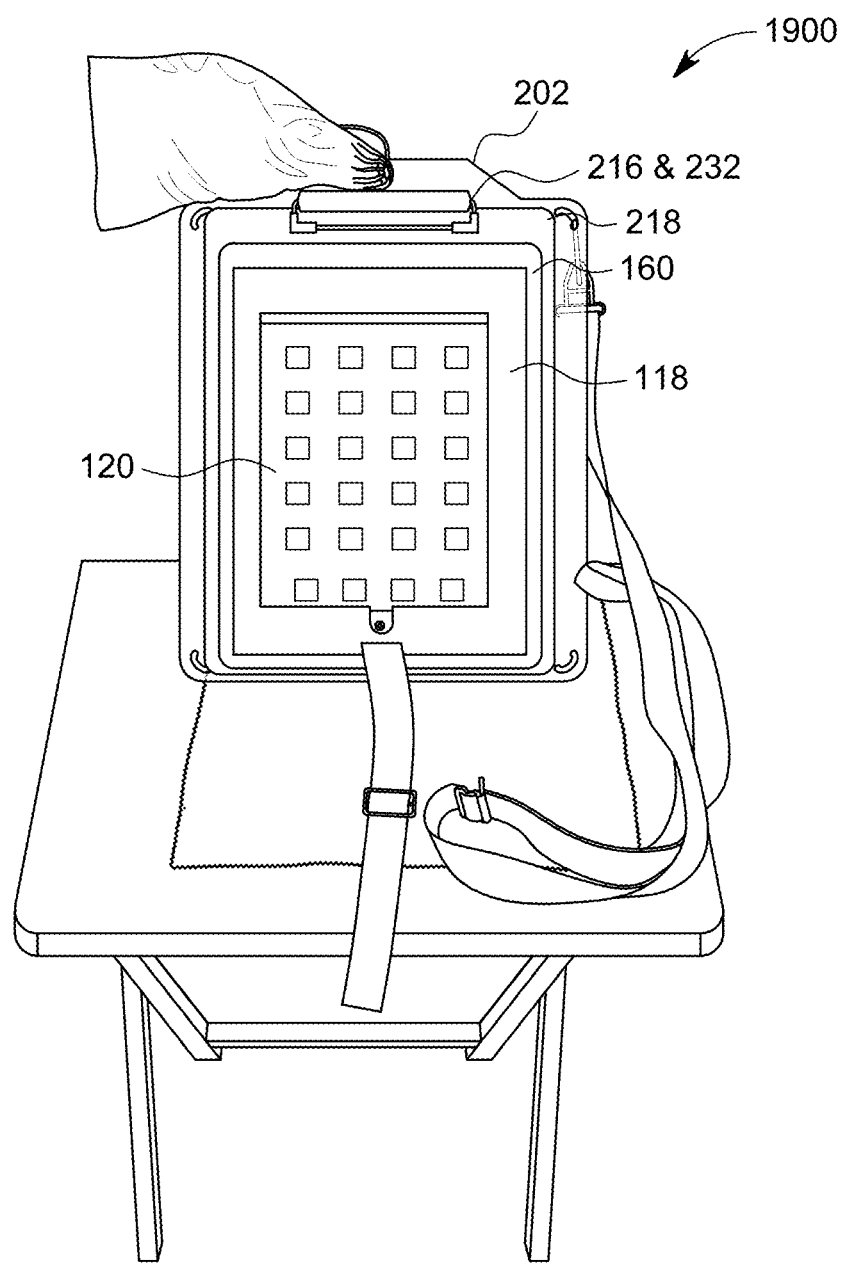
FIG. 19 illustrates a frontal view of a complete clipboard and portable computing device system using the double-sided clipboard.

FIG. 19 illustrates a frontal view 1900 of a complete clipboard and portable computing device system 200 using the double-sided clipboard 202. The device display 120 is exposed while the case 118 is secured to the auxiliary board 218 using the cover 160. The auxiliary board 218 is then clamped to the double-sided clipboard 202 using the backside clipping apparatus 216 and the auxiliary board clipping apparatus 232, at the auxiliary top edge 224 and top edge 208 of the double-sided clipboard 202.

Figure 20:
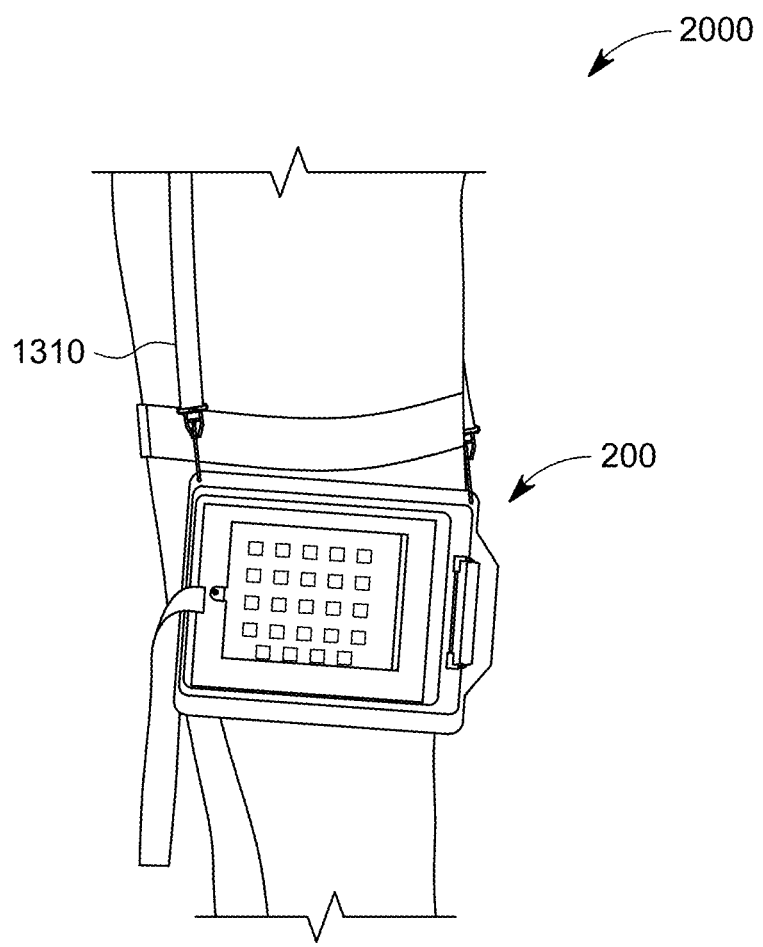
FIG. 20 illustrates a carrying view of a complete clipboard and portable computing device system using the double-sided clipboard employed in the carry mode by the user.

FIG. 20 illustrates a carrying view 2000 of a complete clipboard and portable computing device system 200 using the double-sided clipboard 202 employed in the carry mode by the user. The system 200 is suspended using the carrying shoulder strap 1310. Of course, the carrying mode applies equally to the clipboard and portable computing device system 100 of FIG. 1.

Figure 21:
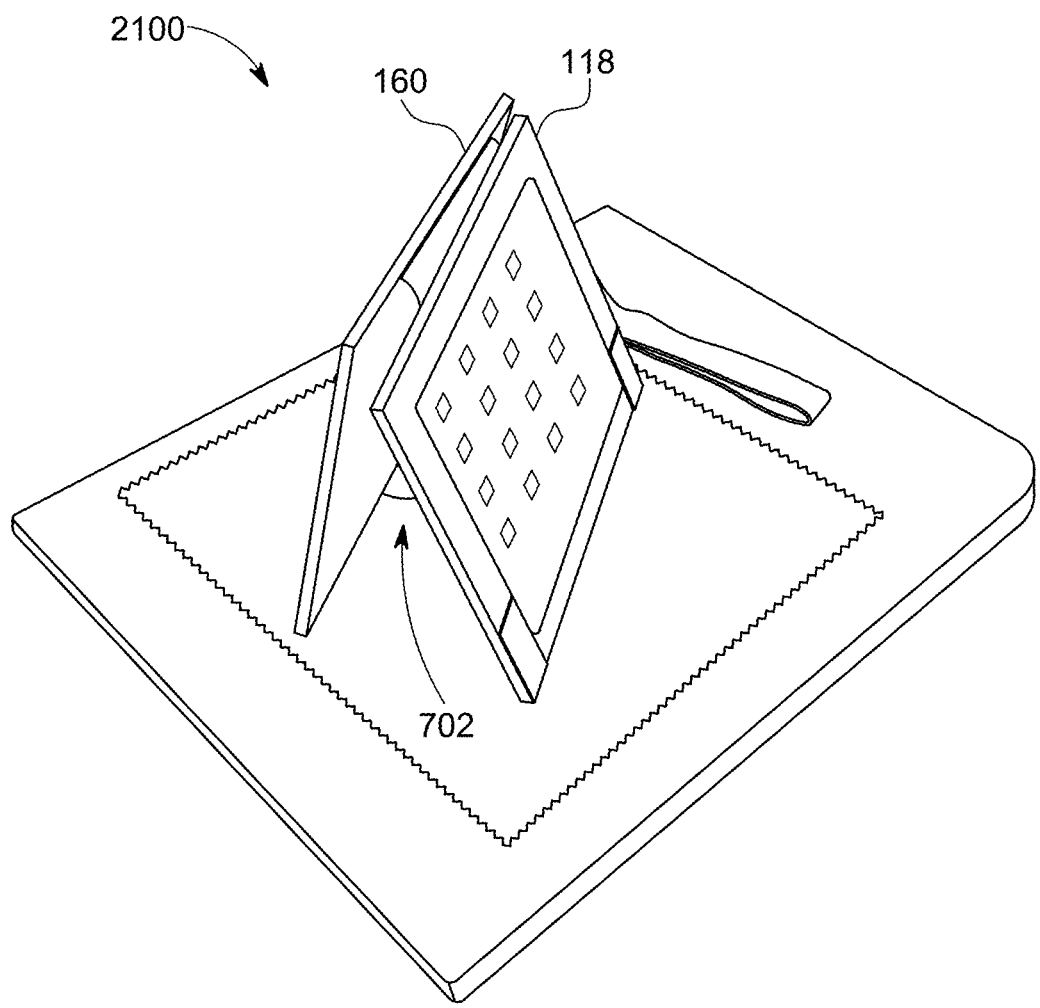
FIG. 21 illustrates a view where the case and case cover facilitate a standalone upright mode for tilted viewing of the inserted portable computing device.

FIG. 21 illustrates a view 2100 where the case 118 and case cover 160 facilitate a standalone upright mode for tilted viewing of the inserted portable computing device. The cover 160 of the case 118 can be attached to the backside of the case 118 using the cover strap 702 in such a way as to enable a propped upright positioning of the display 120 for convenient viewing and interaction with the inserted portable computing device.

In other words, in one implementation, there is provided a clipboard and portable computing device system 100, comprising: a clipboard 102 configured with a first face 104 and a second face 106, a top edge 108, and a frontside clipping apparatus 1402 affixed the first face 104 near the top edge 108; a case 118 in which a portable computing device 500 can be inserted, the case 118 having a back surface 122 and a front surface 124, the front surface 124 having a viewing portion 126 through which a device display 120 of the portable computing device 500 is exposed; and an attachment mechanism 128 configured to attach the case 118 to the clipboard 102, the attachment mechanism 128 comprises a first part 130 attached to the second face 106 of the clipboard 102 and a second part 132 attached to the back surface 122 of the case 118, the second part 132 mates to the first part 130.

The clipboard 102 has coupled thereto a shoulder strap 1310 for carrying the clipboard 102 and portable computing device 500 (in the case 118). The case 118 optionally comprises a hinged cover 160 that pivots to a closed position to cover the front surface 124 of the case 118 to protect the portable computing device 500, or an open position to expose the front surface 124 of the case 118 for access to the display 120 of the portable computing device 500. The hinged cover 160 secures to the case 118 in the open position and comprises an inside attachment portions (302A and 302B) that serve as part of the attachment mechanism 128 when in the open position to attach the hinged cover 160 to the second face 106 of the clipboard 102.

In another implementation, there is provided a clipboard and portable computing device system 200, comprising: a double-sided clipboard 202 having a first face 204 and a second face 206, a top edge 208, and a backside clipping apparatus 216 affixed near the top edge 208 of the second face 206; an auxiliary board 218 attached to the second face 206 of the double-sided clipboard 202 via the backside clipping apparatus 216, the auxiliary board 218 having a first auxiliary face 220 and a second auxiliary face 222, an auxiliary top edge 224, and an auxiliary board clipping apparatus 232 affixed near the top edge 224 of the first auxiliary face 220; a case 118 capable of receiving and enclosing a portable computing device 500, the case 118 having a back surface 122, a front surface 124 parallel to and that opposes the back surface 122 and exposes the viewing portion 126 via which a display 120 of the device 500 can be viewed; and an attachment mechanism 234 that attaches the case 118 to the second auxiliary face 222 of the auxiliary board 218.

The clipboard 202 is the double-sided clipboard 202, which further comprises a frontside clipping apparatus 1402, the backside clipping apparatus 216 captures the auxiliary board 218 via an auxiliary board clipping apparatus 232, and the backside clipping apparatus 216 captures documents. The auxiliary board 218 is configured to enable attachment of the case 118 to the auxiliary board 218, the auxiliary board 218 attaches to one side of the double-sided clipboard 202 such that unimpeded access is provided to both the documents and the portable computing device. The case 118 further comprises a cover 160 that closes over the front surface 124 of the case 118.

The cover 118 folds back in a fully open position to expose a viewing portion 126 in the front surface 124 of the case 118 through which to view a display 120 of the portable computing device 500, the cover 118 further comprises inside attachment portions (302A and 302B) that serve as one part of the attachment mechanism 234 to secure the case 118 to the auxiliary board 218. The cover 160, when in the fully open position, is secured to a back of the case 118 using a cover strap 702. The auxiliary board 218 can be propped up to a tilted angle using a propping member 1702, the tilted angle enables hands-free viewing of and interaction with a display 120 of the portable computing device 500 while in a stationary orientation.

In yet another implementation, there is provided a clipboard and portable computing system, comprising: a double-sided clipboard 202 having a first face 204 and a second face 206, a top edge 208, a backside clipping apparatus 216 affixed to the second face 206 near the top edge, and a frontside clipping apparatus 1402 affixed to the first face 204 near the top edge 208; an auxiliary board 218 attached to the second face 206 of the clipboard 202 via the backside clipping apparatus 216, the auxiliary board 218 having a first auxiliary face 220 and a second auxiliary face 222, an auxiliary top edge 224, and an auxiliary board clipping apparatus 232 affixed to the second auxiliary face 222 near the auxiliary top edge 224 of the auxiliary board 218; a case 118 capable of receiving and enclosing a portable computing device 500, the case 118 having a back surface 122, a front surface 124 that opposes the back surface 122 and exposes a viewing portion 126 via which a display 120 of the device 500 is viewed, and a cover 160 that closes over the front surface 124; and an attachment mechanism 234 that enables attachment of the portable computing device 500 to the double-sided clipboard 202 via the cover 118; wherein the double-sided clipboard 202, auxiliary board 218, and case 118 are combined as a single productivity unit for document access and portable computing device access using the attachment mechanism 234, frontside clipping apparatus 1402, and backside clipping apparatus 216.

The double-sided clipboard 202 has coupled thereto a two-point shoulder strap 1310 via corner slots 1306, for carrying the double-sided clipboard 202 and portable computing device 500 as the single productivity unit. The case 118 further comprises multiple cutouts (e.g., cutout 136, cutout 138, etc.) that enable access with device controls of the portable computing device 500 and external access by device sensors of the portable computing device 500. The cover 118 comprises inside attachment portions (302A and 302B) that function as part of the attachment mechanism 234 to attach the cover 118 to the auxiliary board 218. The cover 118, when in the fully open position, is secured to the back of the case 118 using a cover strap 702. The clipboard and portable computing device system 200 can further comprise a tether 304, one end of which is captured in the case 118.

The clipboard and portable computing device system 200 can further comprise a utility bag 1106 that couples to the double-sided clipboard 202. The auxiliary board 218 can be propped up to a tilted angle using a propping member 1702, where the tilted angle enables a hands-free viewing of and interaction with a display 120 of the portable computing device 500. The auxiliary board 218 further comprises a supplemental attachment apparatus 1302 near an auxiliary bottom edge 226 to secure the auxiliary board 218 to the second face 206 of the double-sided clipboard 202.

What has been described above includes examples of the disclosed system. It is, of course, not possible to describe every conceivable combination of components and/or methodologies, but one of ordinary skill in the art may recognize that many further combinations and permutations are possible. Accordingly, the novel system is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A case for a portable computing device, the case comprising:
    a back surface and a front surface, the front surface includes a viewing portion through which a display of the portable computing device is viewed;
    a hinged cover secured to the case, the hinged cover serves as part of an attachment mechanism that attaches the back surface of the case to a clipboard; and
    multiple cutouts that enable access to device controls of the portable computing device and external access by device sensors of the portable computing device.

2. The case of claim 1, wherein the hinged cover comprises inside attachment portions that function as part of the attachment mechanism to attach the case to the clipboard, enabling interchangeable usage of the portable computing device and the clipboard.

3. The case of claim 2, wherein the hinged cover, when in the fully open position, is secured to a back of the case using a cover strap, and, the cover strap and inside attachment portions serve as the attachment mechanism.

4. The case of claim 2, wherein the inside attachment portions of the hinged cover serve to protect the display from damage when the hinged cover is closed.

5. The case of claim 1, wherein the case is detached, rotated to a desired orientation, and then reattached to a clipboard assembly to prop the computing device at a desired angle.

6. The case of claim 1, wherein the clipboard comprises one or more clipping apparatuses for retaining at least one of documents or an auxiliary board to which the case attaches.

7. The case of claim 6, wherein the clipboard is a single-sided clipboard having a single clipping apparatus, or a double-sided clipboard having a backside clipping apparatus and a frontside clipping apparatus.

8. A case for a portable computing device, the case comprising:
    a back surface and a front surface, the front surface includes a viewing portion through which a display of the portable computing device is exposed;
    an attachment mechanism configured to attach the case to a clipboard, the attachment mechanism comprises:
        a first part attached to a second face of the clipboard; and,
        a second part attached to the back surface of the case and that mates to the first part;
    and a hinged cover secured to the case, the hinged cover serves as part of the attachment mechanism to attach the case to the clipboard.

9. The case of claim 8, wherein the case has coupled thereto a tether for carrying the clipboard and portable computing device.

10. The case of claim 8, wherein the hinged cover pivots to a closed position to cover the front surface of the case to protect the portable computing device, and pivots to an open position to expose the front surface of the case for access to the display of the portable computing device.

11. The case of claim 8, wherein the hinged cover secures to the case in an open position and comprises inside attachment portions that serve as part of the attachment mechanism when in the open position to attach the hinged cover to the clipboard.

12. The case of claim 8, further comprising multiple cutouts that enable access to device controls of the portable computing device and external access by device sensors of the portable computing device.

13. A case for a portable computing device, the case comprising:
a back surface and a front surface, the front surface includes a viewing portion through which a display of the portable computing device is exposed;
an attachment mechanism configured to attach the case to a double-sided clipboard via an auxiliary board, the attachment mechanism comprises:
a first part attached to a second face of the double-sided clipboard; and,
a second part attached to the back surface of the case and that mates to the first part;
and
a hinged cover secured to the case, the hinged cover serves as part of the attachment mechanism to attach the case to the auxiliary board.

14. The case of claim 13, wherein the double-sided clipboard further comprises clipping apparatuses that capture the auxiliary board and documents.

15. The case of claim 13, wherein the case attaches to the auxiliary board and the auxiliary board attaches to one side of the double-sided clipboard, providing unimpeded access to both the documents of the clipboard and the portable computing device in the case.

16. The case of claim 13, wherein the hinged cover closes over the front surface of the case.

17. The case of claim 13, wherein the hinged cover folds back in a fully open position to expose a viewing portion in the front surface of the case through which to view a display of the portable computing device, the hinged cover further comprises inside attachment portions that serve as one part of the attachment mechanism to secure the case to the auxiliary board.

18. The case of claim 13, wherein the hinged cover, when in the fully open position, is secured to a back of the case.

19. The case of claim 13, wherein the case is propped up to a tilted angle via the auxiliary board, the auxiliary board propped up to the tilted angle using a propping member, the tilted angle enables a hands-free viewing of and interaction with a display of the portable computing device in the case.

* * * * *